US011271708B2

(12) United States Patent
Hwang et al.

(10) Patent No.: US 11,271,708 B2
(45) Date of Patent: Mar. 8, 2022

(54) METHOD FOR TRANSMITTING OR RECEIVING SIGNAL IN WIRELESS COMMUNICATION SYSTEM, AND DEVICE THEREFOR

(71) Applicant: LG Electronics Inc., Seoul (KR)

(72) Inventors: Seunggye Hwang, Seoul (KR); Seonwook Kim, Seoul (KR); Changhwan Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/789,582

(22) Filed: Feb. 13, 2020

(65) Prior Publication Data

US 2020/0186321 A1 Jun. 11, 2020

Related U.S. Application Data

(63) Continuation of application No. PCT/KR2019/003866, filed on Apr. 2, 2019.

(30) Foreign Application Priority Data

Apr. 2, 2018 (KR) .......................... 10-2018-0038146

(51) Int. Cl.
*H04W 4/00* (2018.01)
*H04L 5/14* (2006.01)
*H04W 72/04* (2009.01)

(52) U.S. Cl.
CPC .............. *H04L 5/14* (2013.01); *H04W 72/042* (2013.01)

(58) Field of Classification Search
CPC ....... H04L 5/14; H04L 1/1607; H04L 5/0007; H04L 1/1812; H04L 1/1854;
(Continued)

(56) References Cited

U.S. PATENT DOCUMENTS 10,356,752 B1 * 7/2019 Menon .................. H04W 68/02
2010/0238845 A1 * 9/2010 Love .................. H04W 72/1263
370/280
(Continued)

FOREIGN PATENT DOCUMENTS

| EP | 3300287 | 3/2018 |
| WO | WO2017169005 | 10/2017 |
| WO | WO2017196246 | 11/2017 |

OTHER PUBLICATIONS

Ericsson, "DL aspects of TDD for NB-IoT," R1-1801500, 3GPP TSG-RAN WG1 Meeting #92, Athens, Greece, dated Feb. 26-Mar. 2, 2018, 15 pages.
(Continued)

*Primary Examiner* — Stephen M D Agosta
(74) *Attorney, Agent, or Firm* — Fish & Richardson P.C.

(57) ABSTRACT

The present invention relates to a method for receiving a signal in a wireless communication system supporting narrowband Internet of things (NB-IoT) operated in time division duplex (TDD) and a device therefor, the method comprising the steps of: configuring a search space for a physical downlink control channel; and monitoring the physical downlink control channel on the basis of the configured search space, wherein the search space is configured by a TDD special subframe from which aggregation level 1 has been excluded, and the TDD special subframe indicates a subframe including a downlink period, a guard period, and an uplink period.

18 Claims, 31 Drawing Sheets

(58) Field of Classification Search
CPC .............. H04L 1/1887; H04W 72/042; H04W 72/0413; H04W 24/02; H04W 4/70; H04W 72/005; H04W 72/044; H04J 11/00; H04J 11/0069; H04J 11/005; H04J 11/0023; H04J 2211/005; H04B 7/2606; H04B 7/155; H04B 7/0421; H04B 7/043; H04B 7/0456; H04B 7/0617

See application file for complete search history.

(56) References Cited

U.S. PATENT DOCUMENTS

| | | | | |
|---|---|---|---|---|
| 2011/0194524 | A1* | 8/2011 | Hedlund | H04L 5/0053 370/329 |
| 2012/0307821 | A1* | 12/2012 | Kwon | H04W 56/0045 370/350 |
| 2013/0230017 | A1* | 9/2013 | Papasakellariou | H04L 1/1861 370/330 |
| 2014/0078978 | A1* | 3/2014 | Cheng | H04L 1/0041 370/329 |
| 2015/0229455 | A1* | 8/2015 | Seo | H04L 5/0007 370/329 |
| 2015/0289239 | A1* | 10/2015 | Saito | H04L 5/0091 370/329 |
| 2016/0150539 | A1* | 5/2016 | Xu | H04W 72/0446 370/329 |
| 2016/0183231 | A1* | 6/2016 | Shi | H04W 72/0446 370/329 |
| 2016/0301556 | A1* | 10/2016 | Nory | H04L 1/0072 |
| 2016/0353440 | A1* | 12/2016 | Lee | H04W 72/0453 |
| 2017/0099653 | A1* | 4/2017 | Yoo | H04W 48/16 |
| 2017/0134880 | A1* | 5/2017 | Rico Alvarino | H04W 4/70 |
| 2017/0181135 | A1* | 6/2017 | Chen | H04L 5/0092 |
| 2017/0288845 | A1* | 10/2017 | Axmon | H04W 72/042 |
| 2017/0318620 | A1* | 11/2017 | Tseng | H04W 52/0216 |
| 2017/0332359 | A1 | 11/2017 | Tsai et al. | |
| 2018/0048984 | A1* | 2/2018 | Park | H04L 1/08 |
| 2018/0048985 | A1 | 2/2018 | Park et al. | |
| 2018/0049246 | A1* | 2/2018 | Park | H04W 74/0833 |
| 2018/0115943 | A1* | 4/2018 | Park | H04W 68/00 |
| 2018/0183551 | A1* | 6/2018 | Chou | H04L 5/001 |
| 2018/0317198 | A1* | 11/2018 | Lee | H04W 68/005 |
| 2018/0317205 | A1* | 11/2018 | Takeda | H04W 72/0453 |
| 2018/0343091 | A1* | 11/2018 | Xia | H04L 5/005 |
| 2019/0029005 | A1* | 1/2019 | Bendlin | H04L 5/0053 |
| 2019/0045525 | A1* | 2/2019 | Shi | H04W 72/0493 |
| 2019/0053140 | A1* | 2/2019 | Wong | H04L 1/08 |
| 2019/0098659 | A1* | 3/2019 | Reddy | H04W 74/004 |
| 2019/0215872 | A1* | 7/2019 | Park | H04W 74/0833 |
| 2019/0305899 | A1* | 10/2019 | Rico Alvarino | H04L 5/0053 |
| 2019/0334687 | A1* | 10/2019 | Su | H04L 5/0023 |
| 2019/0335428 | A1* | 10/2019 | Bendlin | H04W 72/042 |
| 2019/0357270 | A1* | 11/2019 | Kurth | H04W 76/27 |
| 2020/0186321 | A1* | 6/2020 | Hwang | H04L 5/0053 |
| 2020/0280393 | A1* | 9/2020 | Qu | H04B 17/336 |
| 2020/0305129 | A1* | 9/2020 | Lee | H04W 72/0446 |

OTHER PUBLICATIONS

Nokia, Nokia Shanghai Bell, "Downlink aspects of TDD support in NB-IoT," R1-1802279, 3GPP TSG RAN WG1 Meeting #92, Athens, Greece, dated Feb. 26-Mar. 2, 2018, 7 pages.
ZTE, Sanechips, "Summary of remaining issues of DL aspects for TDD NB-IoT," R1-1803117, 3GPP TSG RAN WG1 Meeting #92, Athens, Greece, dated Feb. 26-Mar. 2, 2018, 8 pages.
Chinese Office Action in Chinese Application No. 201980004487.1, dated Jul. 27, 2020, 9 pages (with English translation).
Extended European Search Report in European Appln. No. 19781770.3, dated Oct. 30, 2020, 12 pages.
Japanese Office Action in Japanese Appln. No. 2020-513866, dated May 13, 2020, 5 pages (with English translation).
ZTE, Sanechips, "Summary of remaining issues of DL aspects for TDD NB-IoT," R1-1803144, 3GPP TSG RAN WG1 Meeting #92, Athens, Greece, dated Feb. 26-Mar. 2, 2018, 8 pages.

* cited by examiner

In-band system

Guard-band system

Stand-alone system

Search space configuration when DwPTS is not used

Search space configuration when DwPTS is used

Type1 - CSS & Type1A - CSS

Type2 - CSS & Type2A - CSS & USS

METHOD FOR TRANSMITTING OR RECEIVING SIGNAL IN WIRELESS COMMUNICATION SYSTEM, AND DEVICE THEREFOR

CROSS-REFERENCE TO RELATED APPLICATIONS

This application is a continuation of International Application No. PCT/KR2019/003866, filed on Apr. 2, 2019, which claims priority under 35 U.S.C. 119(a) to Korean Patent Application No. 10-2018-0038146, filed on Apr. 2, 2018. The disclosures of the prior applications are incorporated by reference in their entirety.

TECHNICAL FIELD

The present disclosure relates to a wireless communication system, and more specifically relates to a method of transmitting or receiving a signal in a time division duplex (TDD) system and an apparatus therefor.

BACKGROUND

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, Massive Multiple Input Multiple Output (Massive MIMO), In-band Full Duplex, Non-Orthogonal Multiple Access (NOMA), support of Super wideband, and Device Networking are under research.

SUMMARY

The object of the present disclosure is to provide a method and apparatus for efficiently transmitting or receiving a physical downlink control channel.

Specifically, the object of the present disclosure is to provide a method and apparatus for efficiently transmitting or receiving a physical downlink control channel in a special subframe in a narrowband Internet-of-Things (NB-IoT) system operating in time division duplex (TDD).

It will be appreciated by persons skilled in the art that the objects that could be achieved with the present disclosure are not limited to what has been particularly described hereinabove and the above and other objects that the present disclosure could achieve will be more clearly understood from the following detailed description.

In a first aspect of the present disclosure, provided herein is a method for receiving a signal by a user equipment (UE) in a wireless communication system supporting narrowband Internet of Things (NB-IoT) operating in time division duplex (TDD), the method comprising: configuring a search space for a physical downlink control channel; and monitoring the physical downlink control channel based on the configured search space, wherein the search space may be configured except aggregation level 1 in a TDD special subframe, and wherein the TDD special subframe may represent a subframe including a downlink period, a guard period, and an uplink period.

In a second aspect of the present disclosure, provided herein is a user equipment (UE) for receiving a signal in a wireless communication system, the UE comprising: a radio frequency (RF) transceiver; and a processor operatively connected to the RF transceiver, wherein the processor is configured to configure a search space for a physical downlink control channel and monitor the physical downlink control channel based on the configured search space, wherein the search space may be configured except aggregation level 1 in a TDD special subframe, and wherein the TDD special subframe may represent a subframe including a downlink period, a guard period, and an uplink period.

In a third aspect of the present disclosure, provided herein is a device for a user equipment (UE) for receiving a signal in a wireless communication system, the device comprising: a memory including executable codes; and a processor operatively connected to the memory, wherein the processor is configured to perform the executable codes to implement operations comprising: configuring a search space for a physical downlink control channel; and monitoring the physical downlink control channel based on the configured search space, wherein the search space is configured except aggregation level 1 in a TDD special subframe, and wherein the TDD special subframe represents a subframe including a downlink period, a guard period, and an uplink period.

Preferably, the search space may be configured with only aggregation level 2 in the TDD special subframe.

Preferably, when a number of repetitions for the physical downlink control channel is equal to 1, the search space may be configured except aggregation level 1 in the TDD special subframe.

Preferably, when the downlink period of the TDD special subframe includes a specific number of orthogonal frequency division multiplexing (OFDM) symbols or less, the search space may be configured except aggregation level 1 in the TDD special subframe.

Preferably, when a value indicated by control format indicator (CFI) information for the TDD special subframe is less than a specific value, the search space may be configured except aggregation level 1 in the TDD special subframe.

Preferably, the search space may include a common search space (CSS).

Preferably, the search space may include a UE-specific search space (USS).

Preferably, when a maximum number of repetitions Rmax for the physical downlink control channel is configured to be less than a specific value, the search space may be configured except aggregation level 1 in the TDD special subframe.

Preferably, when a number of repetitions R for the physical downlink control channel is less than a specific value Rth, the search space may be configured except aggregation level 1 in the TDD special subframe.

Preferably, the specific value Rth may be indicated by higher layer signaling, or determined based on a maximum number of repetitions Rmax for the physical downlink control channel.

Preferably, an aggregation level may represent a number of control channel elements, and one control channel element may include 6 subcarriers.

Preferably, the downlink period may represent a downlink pilot time slot (DwPTS), and the uplink period may represent an uplink pilot time slot (UpPTS).

Preferably, the physical downlink control channel may be a narrowband physical downlink control channel (NPDCCH).

According to the present disclosure, a physical downlink control channel may be efficiently transmitted or received.

Specifically, according to the present disclosure, a physical downlink control channel may be efficiently transmitted or received in a special subframe in an NB-IoT system operating in TDD.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure, illustrate embodiments of the disclosure and together with the description serve to explain the principle of the disclosure.

DETAILED DESCRIPTION

In the following, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification

A. System Architecture

Figure 1:
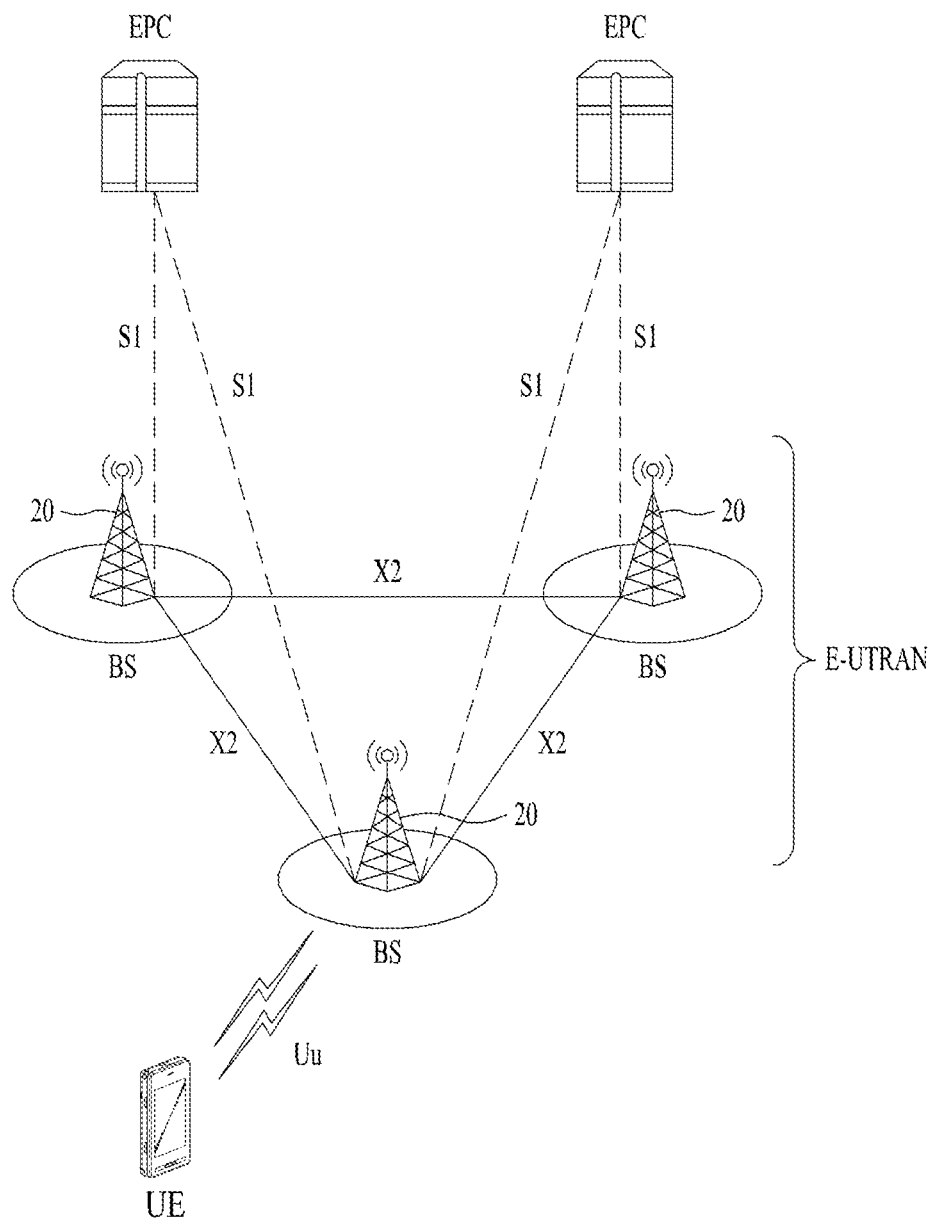
FIG. 1 illustrates an example of the 3GPP LTE system architecture.

FIG. 1 illustrates an example of the 3GPP LTE system architecture.

A wireless communication system may be referred to as an evolved-UMTS terrestrial radio access network (E-UTRAN) or a long term evolution (LTE)/LTE-A system. Referring to FIG. 1, the E-UTRAN includes at least one BS 20 that provides control and user planes to a UE 10. The UE 10 may be fixed or mobile. The UE 10 may be referred to as another terminology such as 'mobile station (MS)', 'user terminal (UT)', 'subscriber station (SS)', 'mobile terminal (MT)', or 'wireless device'. In general, the BS 20 may be a fixed station that communicates with the UE 10. The BS 20 may be referred to as another terminology such as 'evolved Node-B (eNB)', 'general Node-B (gNB)', 'base transceiver system (BTS)', or 'access point (AP)'. The BSs 20 may be interconnected through an X2 interface. The BS 20 may be connected to an evolved packet core (EPC) through an S1 interface. More particularly, the BS 20 may be connected to a mobility management entity (MME) through S1-MME and to a serving gateway (S-GW) through S1-U. The EPC includes the MME, the S-GW, and a packet data network-gateway (P-GW). Radio interface protocol layers between the UE and network may be classified into Layer 1 (L1), Layer 2 (L2), and Layer 3 (L3) based on three lower layers of the open system interconnection (OSI) model well known in communication systems. A physical (PHY) layer, which belongs to L1, provides an information transfer service over a physical channel. A radio resource control (RRC) layer, which belongs to L3, controls radio resources between the UE and network. To this end, the BS and UE may exchange an RRC message through the RRC layer.

Figure 2:
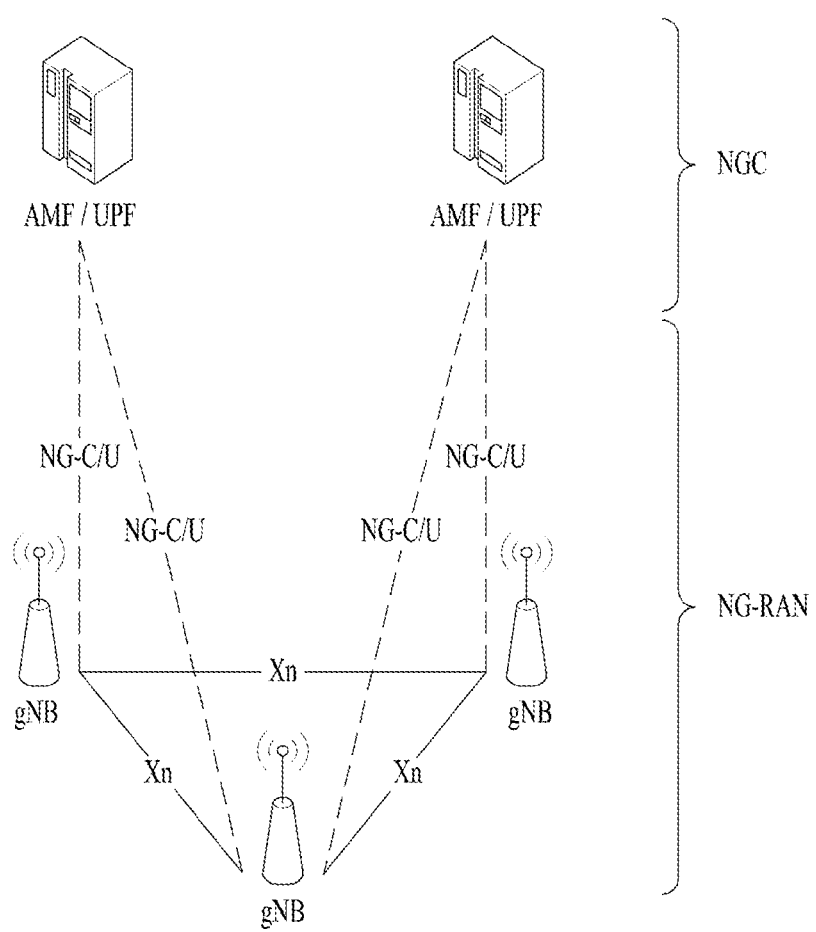
FIG. 2 illustrates an example of the 3GPP NR system architecture.

FIG. 2 illustrates an example of the 3GPP NR system architecture.

Referring to FIG. 2, a NG-RAN includes gNBs, each of which provides a NG-RA user plane (e.g., new AS sublayer/PDCP/RLC/MAC/PHY) and a control plane (RRC) protocol terminal to a UE. The gNBs are interconnected through an Xn interface. The gNB is connected to an NGC through a NG interface. More particularly, the gNB is connected to an access and mobility management function through an N2 interface and to a user plane function (UPF) through an N3 interface.

B. Frame Structure

Hereinafter, an LTE frame structure will be described.

In the LTE standards, the sizes of various fields in the time domain are expressed in a time unit (Ts=1/(15000×2048) seconds) unless specified otherwise. DL and UL transmissions are organized in radio frames, each of which has a duration of 10 ms ($T_f$=307200×Ts=10 ms). Two radio frame structures are supported.

Type 1 is applicable to frequency division duplex (FDD).
Type 2 is applicable to time division duplex (TDD).

(1) Frame Structure Type 1

Frame structure type 1 is applicable to both full-duplex FDD and half-duplex FDD. Each radio frame has a duration of $T_f$=307200·$T_s$=10 ms and is composed of 20 slots, each of which has a length of $T_{slot}$=15360·$T_s$=0.5 ms. The 20 slots are indexed from 0 to 19. A subframe is composed of two consecutive slots. That is, subframe i is composed of slot 2i and slot (2i+1). In the FDD, 10 subframes may be used for DL transmission, and 10 subframes may be available for UL transmissions at every interval of 10 ms. DL and UL transmissions are separated in the frequency domain. However, the UE may not perform transmission and reception simultaneously in the half-duplex FDD system.

Figure 3:
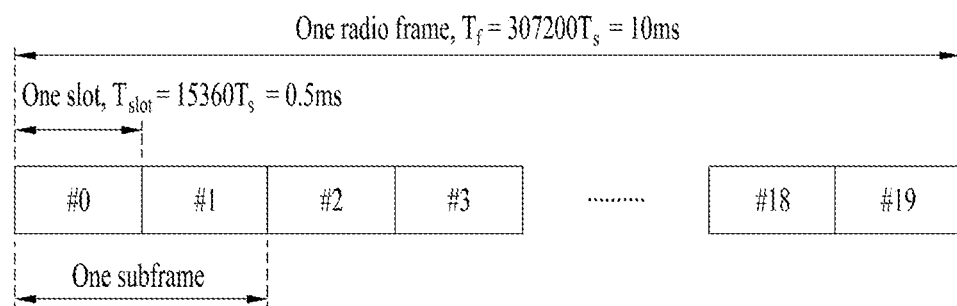
FIG. 3 illustrates a radio frame structure of frame structure type 1.

FIG. 3 illustrates a radio frame structure of frame structure type 1.

Referring to FIG. 3, the radio frame includes 10 subframes. Each subframe includes two slots in the time domain. The time to transmit one subframe is defined as a transmission time interval (TTI). For example, one subframe may have a length of 1 ms, and one slot may have a length of 0.5 ms. One slot may include a plurality of orthogonal frequency division multiplexing (OFDM) symbols in the time domain. Since the 3GPP LTE system uses OFDMA in DL, the OFDM symbol may represent one symbol period. The OFDM symbol may be referred to as an SC-FDMA symbol or a symbol period. A resource block (RB) is a resource allocation unit and includes a plurality of consecutive subcarriers in one slot. This radio frame structure is merely exemplary. Therefore, the number of subframes in a radio frame, the number of slots in a subframe, or the number of OFDM symbols in a slot may be changed in various ways.

(2) Frame Structure Type 2

Frame structure type 2 is applicable to TDD. Each radio frame has a length of $T_f$=307200×$T_s$=10 ms and includes two half-frames, each of which has a length of 15360·$T_s$=0.5 ms. Each half-frame includes five subframes, each of which has a length of 30720·$T_s$=1 ms. Supported UL-DL configurations are defined in the standards. In each subframe of a radio frame, "D" denotes a subframe reserved for DL transmission, "U" denotes a subframe reserved for UL transmission, and "S" denotes a special subframe including the following three fields: downlink pilot time slot (DwPTS), guard period (GP), and uplink pilot time slot (UpPTS). The DwPTS may be referred to as a DL period, and the UpPTS may be referred to as a UL period. The lengths of the DwPTS and UpPTS depend on the total length of the DwPTS, GP, and UpPTS, which is equal to 30720·$T_s$=1 ms Subframe i is composed of $T_{slot}$=two slots, slot 2i and slot (2i+1), each of which has a length of 15360·$T_s$=0.5 ms.

Figure 4:
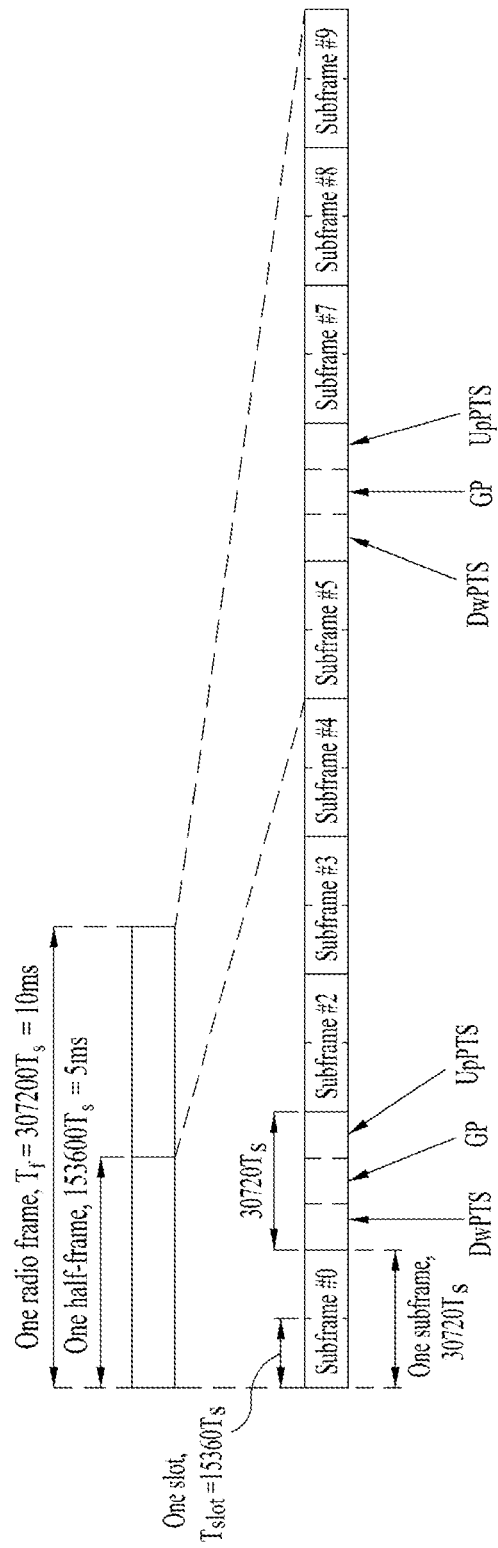
FIG. 4 illustrates a radio frame structure of frame structure type 2.

FIG. 4 illustrates a radio frame structure of frame structure type 2.

FIG. 4 shows that a UL-DL configuration supports DL-to-UL switch-point periodicities of 5 ms and 10 ms. In the case of the 5-ms DL-to-UL switch-point periodicity, the special subframe exists across two half-frames. In the case of the 10-ms DL-to-UL switch-point periodicity, the special subframe exists only in the first half-frame. The DwPTS and subframe 0 and 5 are always reserved for DL transmission, and the UpPTS and a subframe next to the special subframe are always reserved for UL transmission.

Next, a description will be given of a frame structure of NR.

Figure 5:
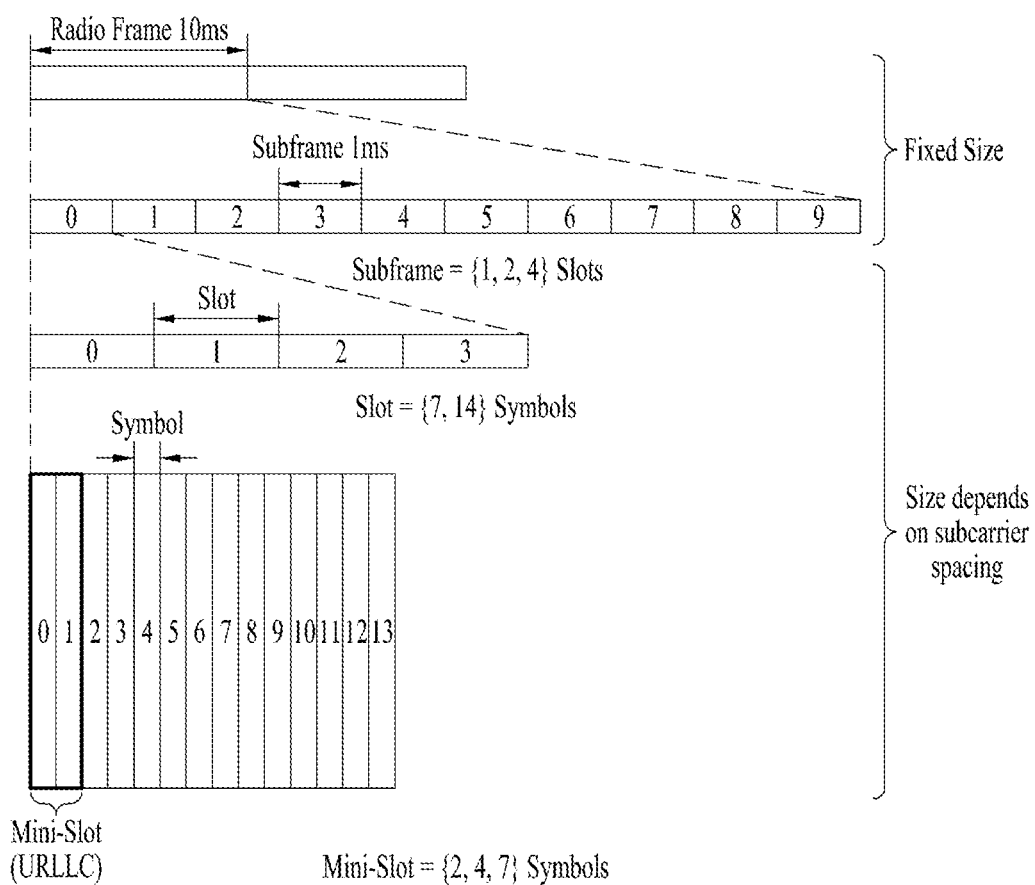
FIG. 5 illustrates an example of a frame structure in NR.

FIG. 5 illustrates an example of a frame structure in NR.

The NR system may support various numerologies. The numerology may be defined by subcarrier spacing and cyclic prefix (CP) overhead. Multiple subcarrier spacing may be derived by scaling basic subcarrier spacing by an integer N (or μ). In addition, even though very low subcarrier spacing is assumed not to be used at a very high subcarrier frequency, a numerology to be used may be selected independently from frequency bands. In the NR system, various frame structures may be supported based on multiple numerologies.

Hereinafter, an OFDM numerology and a frame structure, which may be considered in the NR system, will be described. Table 1 shows multiple OFDM numerologies supported in the NR system.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the sizes of various fields in the time domain are expressed in multiples of a time unit, $T_s=1/\Delta f_{max} \cdot N_f$. In this case, $\Delta f_{max}=480 \cdot 10^3$ and $N_f=4096$. Downlink and uplink transmissions are configured in a radio frame having a duration of $T_f=(\Delta f_{max}N_f/100)\cdot T_s=10$ ms. The radio frame is composed of 10 subframes, each having a duration of $T_{sf}=(\Delta f_{max}N_f/1000)\cdot T_s=1$ ms. In this case, there may be a set of uplink frames and a set of downlink frames. Transmission of an uplink frame with frame number i from a UE needs to be performed earlier by $T_{TA}=N_{TA}T_s$ than the start of a corresponding downlink frame of the UE. Regarding the numerology μ, slots are numbered in a subframe in the following ascending order: $n_s^\mu \in \{0, \ldots, N_{subframe}^{slots,\mu}-1\}$ and numbered in a frame in the following ascending order: $n_{s,f}^\mu \in \{0, \ldots, N_{frame}^{slots,\mu}-1\}$. One slot is composed of $N_{symb}^\mu$ consecutive OFDM symbols, and $N_{symb}^\mu$ is determined by the current numerology and slot configuration. The starts of $n_s^\mu$ slots in a subframe are temporally aligned with those of $n_s^\mu N_{symb}^\mu$ OFDM symbols in the same subframe. Some UEs may not perform transmission and reception at the same time, and this means that some OFDM symbols in a downlink slot or an uplink slot are unavailable. Table 2 shows the number of OFDM symbols per slot ($N_{symb}^{slot}$) the number of slots per radio frame ($N_{slot}^{frame,\mu}$), and the number of slots per subframe ($N_{slot}^{subframe,\mu}$) in the case of a normal CP, and Table 3 shows the number of OFDM symbols per slot, the number of slots per radio frame, and the number of slots per subframe in the case of an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 shows an example of μ=2, i.e., 60 kHz subcarrier spacing (SCS). Referring to Table 2, one subframe may include four slots. FIG. 5 shows slots in a subframe (subframe={1, 2, 4}). In this case, the number of slots included in the subframe may be defined as shown in Table 2 above.

In addition, a mini-slot may be composed of 2, 4, or 7 symbols. Alternatively, the number of symbols included in the mini-slot may vary.

C. Physical Resource

Figure 6:
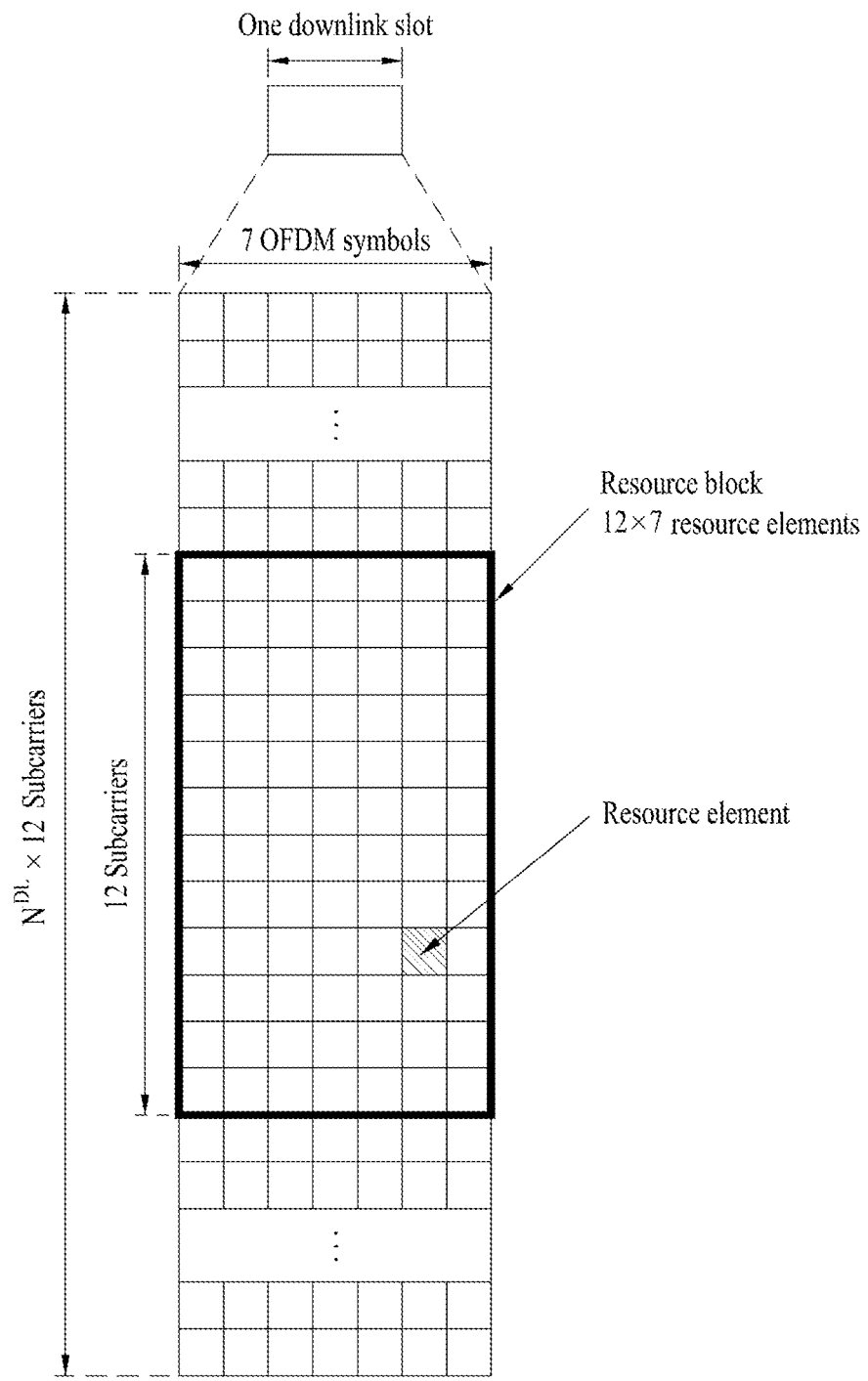
FIG. 6 illustrates a resource grid for one DL slot.

FIG. 6 illustrates a resource grid for one DL slot.

Referring to FIG. 6, a downlink slot includes a plurality of OFDM symbols in the time domain. One downlink slot includes 7 OFDM symbols in the time domain, and a resource block (RB) for example includes 12 subcarriers in the frequency domain. However, the present disclosure is not limited thereto. Each element of the resource grid is referred to as a resource element (RE). One RB includes 12×7 REs. The number of RBs in the DL slot depends on a downlink transmission bandwidth. An uplink slot may have the same structure as the downlink slot.

Figure 7:
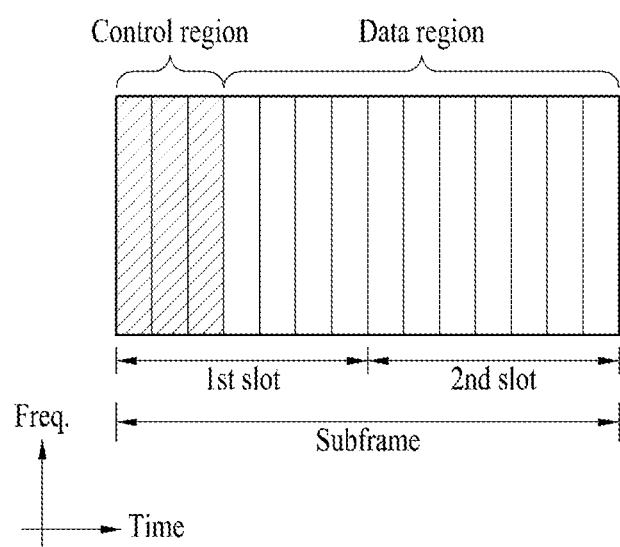
FIG. 7 illustrates the structure of a downlink subframe.

FIG. 7 illustrates the structure of a downlink subframe.

Referring to FIG. 7, up to three OFDM symbols at the start of the first slot in a downlink subframe are used as a control region to which a control channel is allocated. The remaining OFDM symbols are used as a data region to which a physical downlink shared channel (PDSCH) is allocated. Downlink control channels used in the 3GPP LTE system include a physical control format indicator channel (PCFICH), a physical downlink control channel (PDCCH), a physical hybrid ARQ indicator channel (PHICH), etc. The PCFICH is transmitted in the first OFDM symbol in a subframe and carries information for the number of OFDM symbols used for transmitting a control channel. The PHICH carries a hybrid automatic repeat request (HARD) acknowledgement/negative-acknowledgement or not-acknowledgement (ACK/NACK) signal in response to uplink transmission. Control information transmitted on the PDCCH is referred to as downlink control information (DCI). The DCI contains uplink or downlink scheduling information or an uplink transmission (Tx) power control command for a random UE group. The PDCCH carries information for resource allocation for a downlink shared channel (DL-SCH), information for resource allocation for a uplink shared channel, paging information for a paging channel (PCH), and a DL-SCH voice over Internet protocol (VoIP) corresponding to resource allocation for a higher layer control message such as a random access response transmitted on the PDSCH, a set of Tx power control commands for individual UEs in a random UE group, a Tx power control command, activation of the Tx power control command, etc. Multiple PDCCHs may be transmitted in the control region, and the UE may monitor the multiple PDCCHs. The PDCCH may be transmitted on one control channel element (CCE) or aggregation of multiple consecutive CCEs. The CCE is a logical allocation unit used to provide the PDCCH with a coding rate based on the state of a radio channel. The CCE corresponds to a plurality of resource element groups (REGs). A PDCCH format and the number of available PDCCH bits are determined based on a relationship between the number of CCEs and the coding rate provided by the CCE. The base station determines the PDCCH format depending on DCI to be transmitted to the UE and adds a cyclic redundancy check (CRC) to control information. The CRC is masked with a unique identifier (e.g., radio network temporary identifier (RNTI)) according to the owner or usage of the PDCCH. If the PDCCH is for a specific UE, the CRC may be masked with a unique UE identifier (e.g., cell-RNTI). If the PDCCH is for a paging message, the CRC may be masked with a paging indication identifier (e.g., paging-RNTI (P-RNTI)). If the PDCCH is for system information (more specifically, for a system information block (SIB)), the CRC may be masked with a system information identifier and a system information RNTI (SI-RNTI). Further, the CRC may be masked with a random access-RNTI (RA-RNTI) to indicate a random access response in response to transmission of a random access preamble of the UE.

Figure 8:
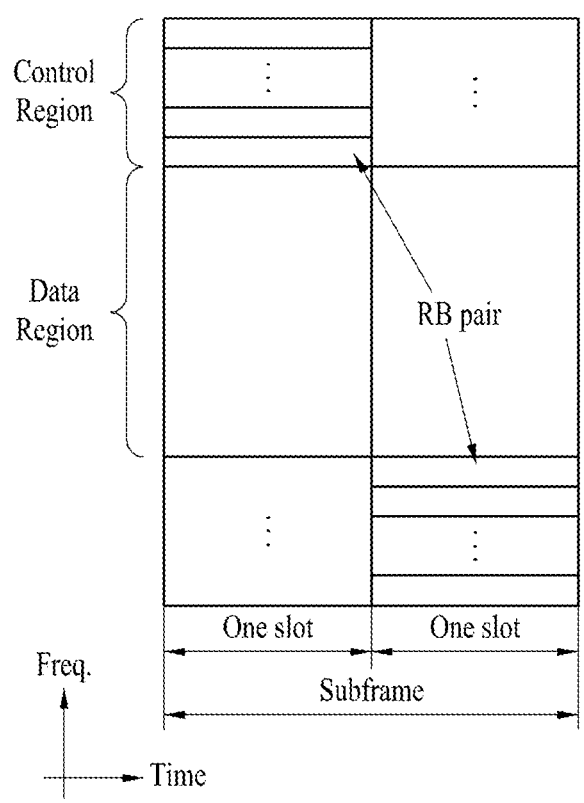
FIG. 8 illustrates the structure of an uplink subframe.

FIG. 8 illustrates the structure of an uplink subframe.

Referring to FIG. 8, an uplink subframe may be divided into a control region and a data region in the frequency domain. A physical uplink control channel (PUCCH) for carrying uplink control information may be allocated to the control region, and a physical uplink shared channel (PUSCH) for carrying user data may be allocated to the data region. The UE may not transmit the PUCCH and the PUSCH at the same time to maintain single-carrier characteristics. The PUCCH for the UE is allocated to an RB pair in a subframe. The RBs included in the RB pair occupy different subcarriers in two slots. In other words, the RB pair allocated for the PUCCH may be frequency-hopped at a slot boundary.

As physical resources in the NR system, an antenna port, a resource grid, a resource element, a resource block, a carrier part, etc. may be considered. Hereinafter, the above physical resources considered in the NR system will be described in detail. First, an antenna port may be defined such that a channel carrying a symbol on the antenna port is inferred from a channel carrying another symbol on the same antenna port. When the large-scale properties of a channel carrying a symbol on an antenna port are inferred from a channel carrying a symbol on another antenna port, the two antenna ports may be said to be in quasi co-located or quasi co-location (QC/QCL) relationship. The large-scale properties may include at least one of delay spread, Doppler spread, frequency shift, average received power, and received timing.

Figure 9:
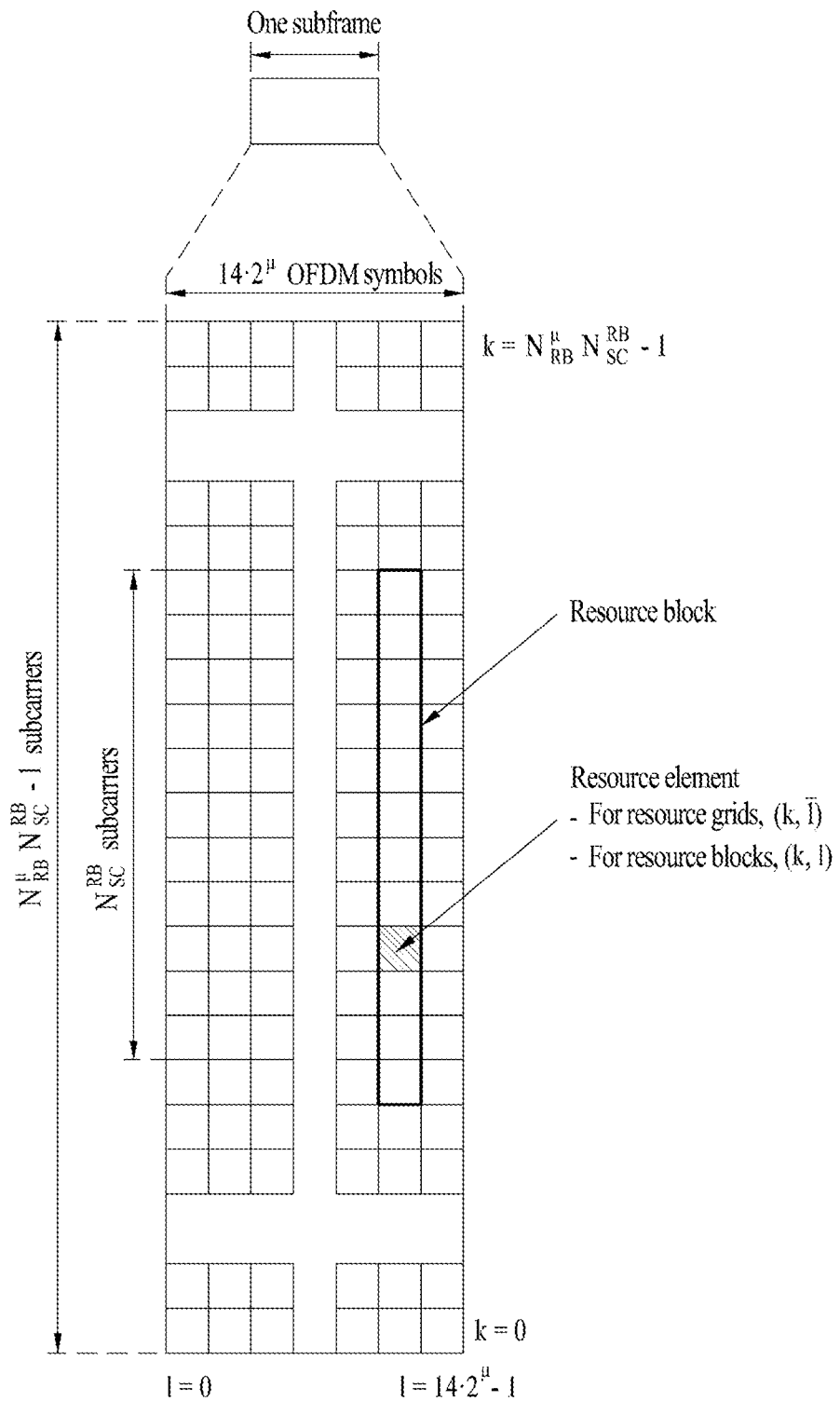
FIG. 9 illustrates an example of a resource grid in NR.

FIG. 9 illustrates an example of a resource grid in NR.

Referring to the resource grid of FIG. 9, there are $N_{RB}^{\mu} N_{sc}^{RB}$ subcarriers in the frequency domain, and there are $14 \cdot 2^\mu$ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^\mu N_{symb}^{(\mu)}$ OFDM symbols. In this case, $N_{RB}^{\mu} \leq N_{RB}^{max,\mu}$. $N_{RB}^{max,\mu}$ denotes the maximum transmission bandwidth and may change not only between numerologies but also between uplink and downlink. As shown in FIG. 9, one resource grid may be configured for each numerology $\mu$ and antenna port p. Each element of the resource grid for the numerology $\mu$ and antenna port p is referred to as a resource element, and it is uniquely identified by an index pair (k,l̄), where k is an index in the frequency domain (k=0, ..., $N_{RB}^{\mu} N_{sc}^{RB}-1$) and denotes the location of a symbol in the subframe (l̄=0, ..., $2^\mu N_{symb}^{(\mu)}-1$). The resource element (k,l̄) for the numerology $\mu$ and antenna port p corresponds to a complex value $\alpha_{k,\bar{l}}^{(p,\mu)}$. When there is no risk of confusion or when a specific antenna port or numerology is not specified, the indexes p and $\mu$ may be dropped, and as a result, the complex value may be $\alpha_{k,\bar{l}}^{(p)}$ or $\alpha_{k,\bar{l}}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration $\mu$.

The center of subcarrier 0 of common resource block 0 for the SCS configuration $\mu$ is equivalent to point A.

The relation between a common RB number $n_{CRB}^{\mu}$ in the frequency domain and a resource element (k,l) for the SCS configuration $\mu$ is determined as shown in Equation 1.

$$n_{CRB}^{\mu} = \left\lfloor \frac{k}{N_{sc}^{RB}} \right\rfloor \quad \text{Equation 1]}$$

In Equation 1, k is defined relative to point A such that k=0 corresponds to a subcarrier centered on point A.

Physical resource blocks are defined within a bandwidth part (BWP) and numbered from 0 to $N_{BWP,i}^{size}-1$, where i denotes the number of the BWP.

The relationship between a physical resource block $n_{PRB}$ and a common resource block $n_{CRB}$ in BWP i is given by Equation 2.

$$n_{CRB} = n_{PRB} + N_{BWP,i}^{start} \quad \text{Equation 2}$$

In Equation 2, $N_{BWP,i}^{start}$ is a common resource block where the BWP starts relative to common resource block 0.

Figure 10:
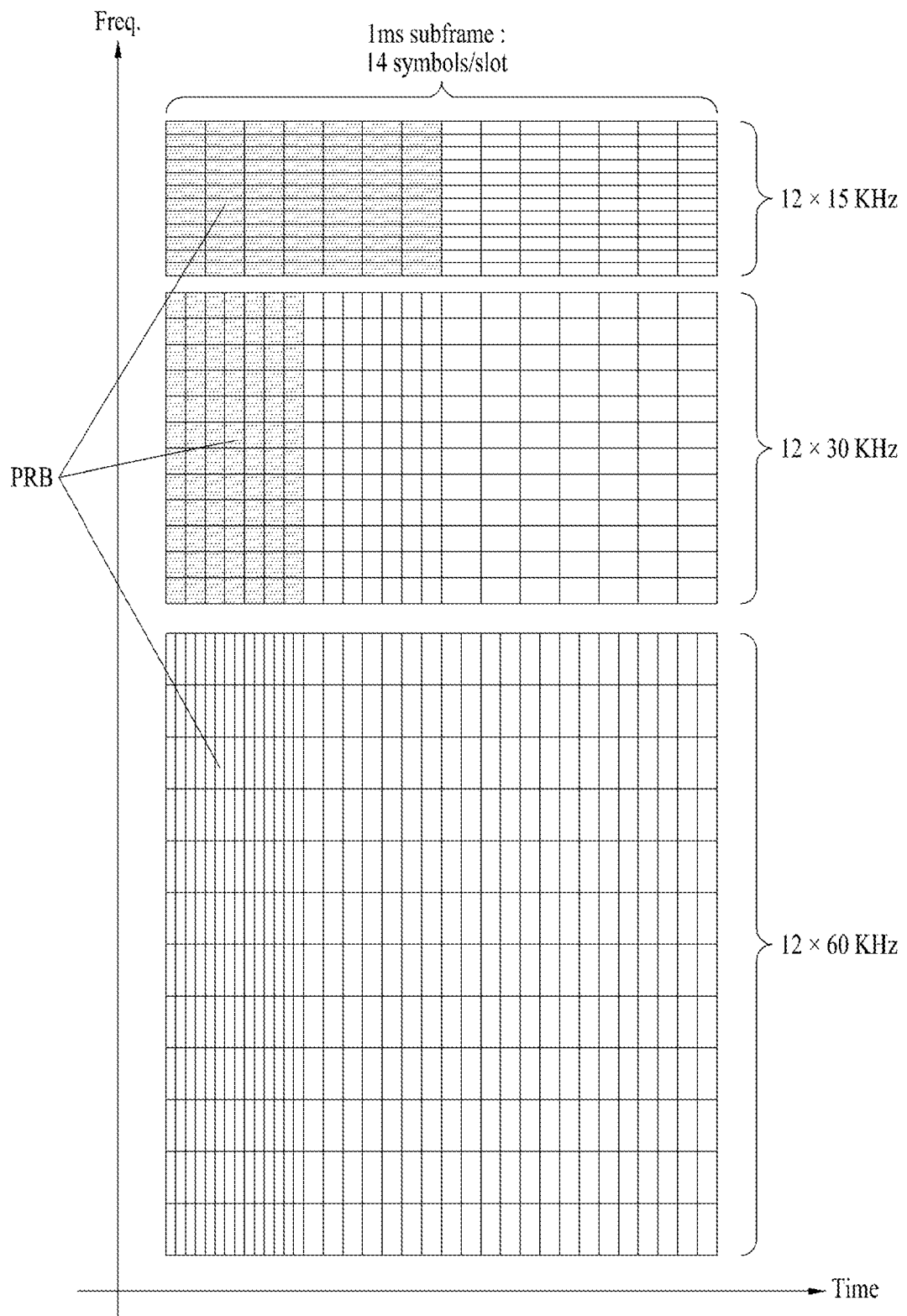
FIG. 10 illustrates an example of a physical resource block in NR.

FIG. 10 illustrates an example of a physical resource block in NR.

D. Wireless Communication Devices

Figure 11:
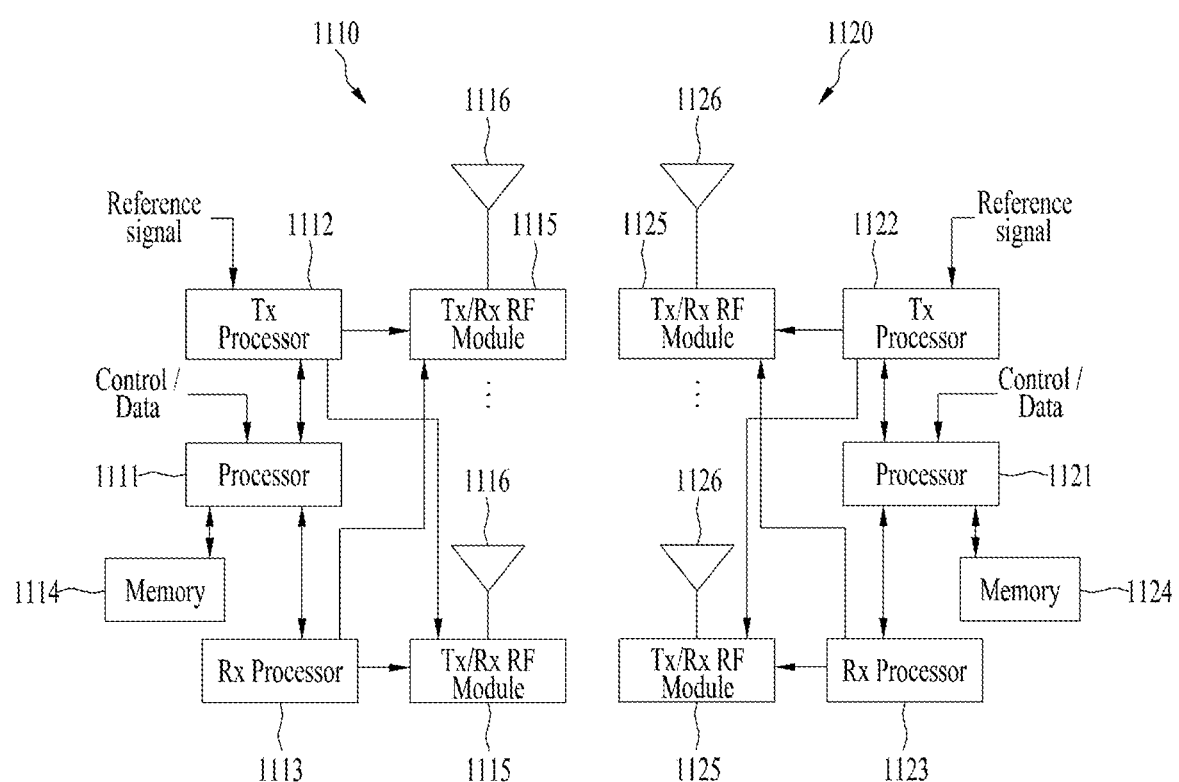
FIG. 11 illustrates a block diagram of a wireless communication apparatus to which the methods proposed in the present disclosure are applicable.

FIG. 11 illustrates a block diagram of a wireless communication apparatus to which the methods proposed in the present disclosure are applicable.

Referring to FIG. 11, a wireless communication system includes a base station 1110 and multiple UEs 1120 located within coverage of the base station 1110. The base station 1110 and the UE may be referred to as a transmitter and a receiver, respectively, and vice versa. The base station 1110 includes a processor 1111, a memory 1114, at least one transmission/reception (Tx/Rx) radio frequency (RF) module (or RF transceiver) 1115, a Tx processor 1112, an Rx processor 1113, and an antenna 1116. The UE 1120 includes a processor 1121, a memory 1124, at least one Tx/Rx RF module (or RF transceiver) 1125, a Tx processor 1122, an Rx processor 1123, and an antenna 1126. The processors are configured to implement the above-described functions, processes and/or methods. Specifically, the processor 1111 provides a higher layer packet from a core network for downlink (DL) transmission (communication from the base station to the UE). The processor implements the functionality of layer 2 (L2). In downlink (DL), the processor provides the UE 1120 with multiplexing between logical and transmission channels and radio resource allocation. That is, the processor is in charge of signaling to the UE. The Tx processor 1112 implements various signal processing functions of layer 1 (L1) (i.e., physical layers). The signal processing functions include facilitating the UE to perform forward error correction (FEC) and performing coding and interleaving. Coded and modulated symbols may be divided into parallel streams. Each stream may be mapped to an OFDM subcarrier, multiplexed with a reference signal (RS) in the time and/or frequency domain, and then combined together using an inverse fast Fourier transform (IFFT) to create a physical channel carrying a time domain OFDMA symbol stream. The OFDM stream is spatially precoded to produce multiple spatial streams. Each spatial stream may be provided to a different antenna 1116 through the Tx/Rx module (or transceiver) 1115. Each Tx/Rx module may modulate an RF carrier with each spatial stream for transmission. At the UE, each Tx/Rx module (or transceiver) 1125 receives a signal through each antenna 1126 thereof. Each Tx/Rx module recovers information modulated on the RF carrier and provides the information to the RX processor 1123. The Rx processor implements various signal processing functions of layer 1. The Rx processor may perform spatial processing on the information to recover any spatial streams toward the UE. If multiple spatial streams are destined for the UE, the multiple spatial streams may be combined by multiple Rx processors into a single OFDMA symbol stream. The RX processor converts the OFDMA symbol stream from the time domain to the frequency domain using a fast Fourier transform (FFT). A frequency-domain signal includes a separate OFDMA symbol stream for each subcarrier of an OFDM signal. The symbols and the reference signal on each subcarrier are recovered and demodulated by determining the most probable signal constellation points transmitted by the base station. Such soft decisions may be based on channel estimation values. The soft decisions are decoded and deinterleaved to recover data and control signals originally transmitted by the base station over the physical channel. The corresponding data and control signals are provided to the processor 1121.

Uplink (UL) transmission (communication from the UE to the base station) is processed by the base station 1110 in a similar way to that described in regard to the receiver functions of the UE 1120. Each Tx/Rx module (or transceiver) 1125 receives a signal through each antenna 1126. Each Tx/Rx module provides an RF carrier and information to the Rx processor 1123. The processor 1121 may be connected to the memory 1124 storing program codes and data. The memory may be referred to as a computer-readable medium.

E. Machine Type Communication (MTC)

The Machine Type Communication (MTC) refers to communication technology adopted by 3$^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC is commonly referred to as 'MTC'.

In the following description, the MTC may be referred to as another terminology such as 'eMTC' 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

1) General Features of MTC (1) The MTC operates only in a specific system bandwidth (or channel bandwidth).

The specific system bandwidth may use 6 RBs of the legacy LTE as shown in Table 4 below and defined by considering the frequency range and subcarrier spacing (SCS) shown in Tables 5 to 7. The specific system bandwidth may be referred to as narrowband (NB). Here, the legacy LTE may encompass the contents described in the 3GPP standards expect the MTC. In the NR, the MTC may use RBs corresponding the smallest system bandwidth in Tables 6 and 7 as in the legacy LTE. Alternatively, the MTC may operate in at least one BWP or in a specific band of a BWP.

TABLE 4

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 5 shows the frequency ranges (FRs) defined for the NR.

TABLE 5

| Frequency range designation | Corresponding frequency range |
|---|---|
| FR1 | 450 MHz-6000 MHz |
| FR2 | 24250 MHz-52600 MHz |

Table 6 shows the maximum transmission bandwidth configuration (NRB) for the channel bandwidth and SCS in NR FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 shows the maximum transmission bandwidth configuration (NRB) for the channel bandwidth and SCS in NR FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} < 4$, $N_{WB}^{UL} = 1$ and a single wideband is composed of $N_{NB}^{UL}$ non-overlapping narrowband(s).

For example, in the case of a 10 MHz channel, 8 non-overlapping narrowbands are defined.

Figure 12A:
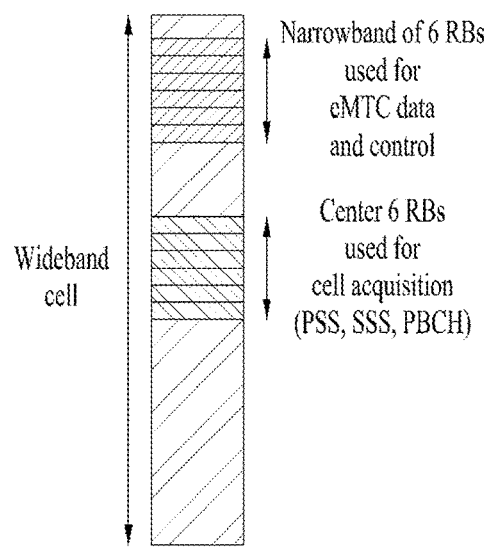
FIGS. 12A and 12B illustrate examples of narrowband operations and frequency diversity.
Figure 12B:
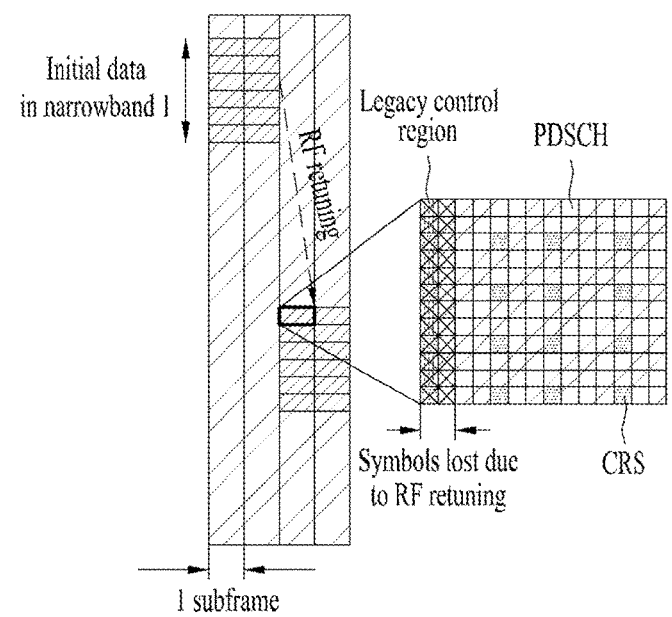

FIGS. 12A and 12B illustrate examples of narrowband operations and frequency diversity.

Specifically, FIG. 12A illustrates an example of the narrowband operation, and FIG. 12B illustrates an example of repetitions with RF retuning.

Hereinafter, frequency diversity by RF retuning will be described with reference to FIG. 12B.

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

2) MTC Operation Mode and Level

Hereinafter, MTC operation modes and levels will be described. To enhance coverage, the MTC may be divided into two operation modes (first and second modes) and four different levels as shown in Table 8 below.

The MTC operation mode may be referred to CE mode. The first and second modes may be referred to CE mode A and CE mode B, respectively.

TABLE 8

| Mode | Level | Description |
| --- | --- | --- |
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3) MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 13:
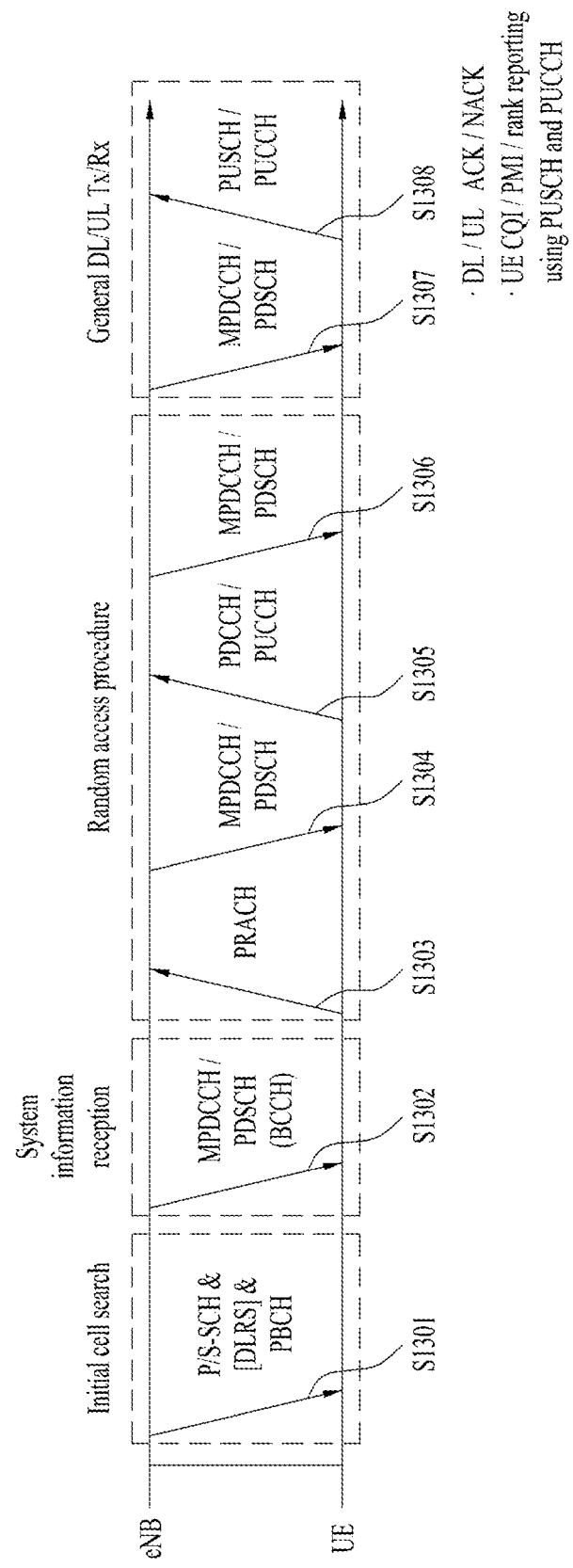
FIG. 13 illustrates physical channels available in MTC and a general signal transmission method using the same.

FIG. 13 illustrates physical channels available in MTC and a general signal transmission method using the same.

When an MTC UE is powered on or enters a new cell, the MTC UE performs initial cell search in step S1301. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figures 14A, 14B:
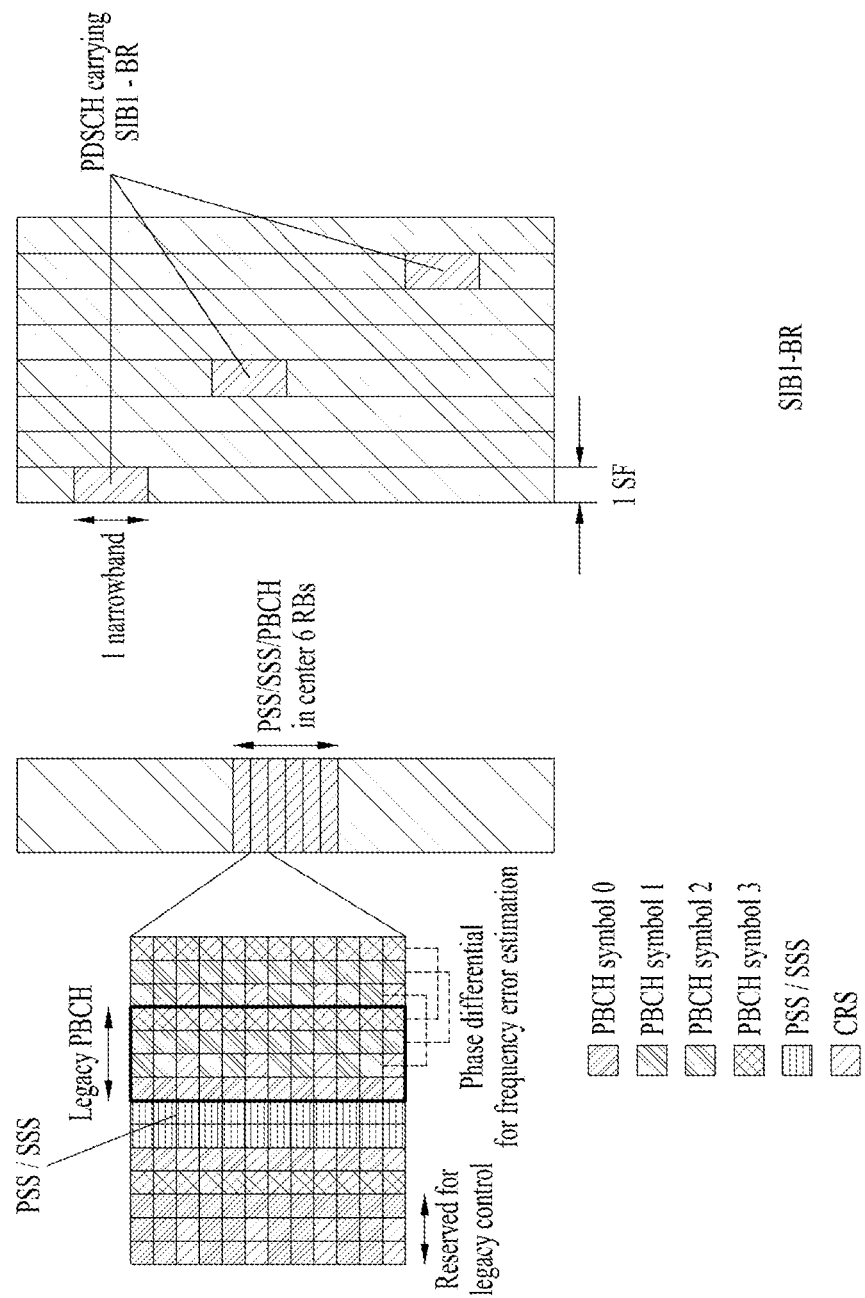
FIGS. 14A and 14B illustrate an example of system information transmissions in MTC.

FIGS. 14A and 14B illustrate an example of system information transmissions in MTC.

Specifically, FIG. 14A illustrates an example of a repetition pattern for subframe #0 in FDD and a frequency error estimation method for a normal CP and repeated symbols, and FIG. 14B illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of the MIB.

TABLE 9

```
-- ASN1START
MasterInformationBlock ::=            SEQUENCE {
    dl-Bandwidth                         ENUMERATED {
                                            n6, n15, n25, n50, n75, n100},
    phich-Config                         PHICH-Config,
    systemFrameNumber                    BIT STRING (SIZE (8)),
    schedulingInfoSIB1-BR-r13            INTEGER (0..31),
    systemInfoUnchanged-BR-r15           BOOLEAN,
    spare                                BIT STRING (SIZE (4))
}
-- ASN1STOP
```

In Table 9, the schedulingInfoSIB1-BR field indicates the index of a table that defines SystemInformationBlockType1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1302. The MPDCCH has the following features: (1) The MPDCCH is very similar to the EPDCCH; (2) The MPDCCH may be transmitted once or repeatedly (the number of repetitions is configured through higher layer signaling); (3) Multiple MPDCCHs are supported and a set of MPDCCHs are monitored by the UE; (4) the MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS)C-RNTI.

To complete the access to the base station, the MTC UE may perform a random access procedure in steps S1303 to S1306. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1303) and receive a response message (e.g., random access response (RAR)) for the preamble on the MPDCCH and the PDSCH related thereto (S1304). In the case of contention-based random access, the MTC UE may perform a contention resolution procedure including transmission of an additional PRACH signal (S1305) and reception of a MPDCCH signal and a PDSCH signal related thereto (S1306). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1307) and transmission of a PUSCH signal and/or a PUCCH signal (S1308) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 15:
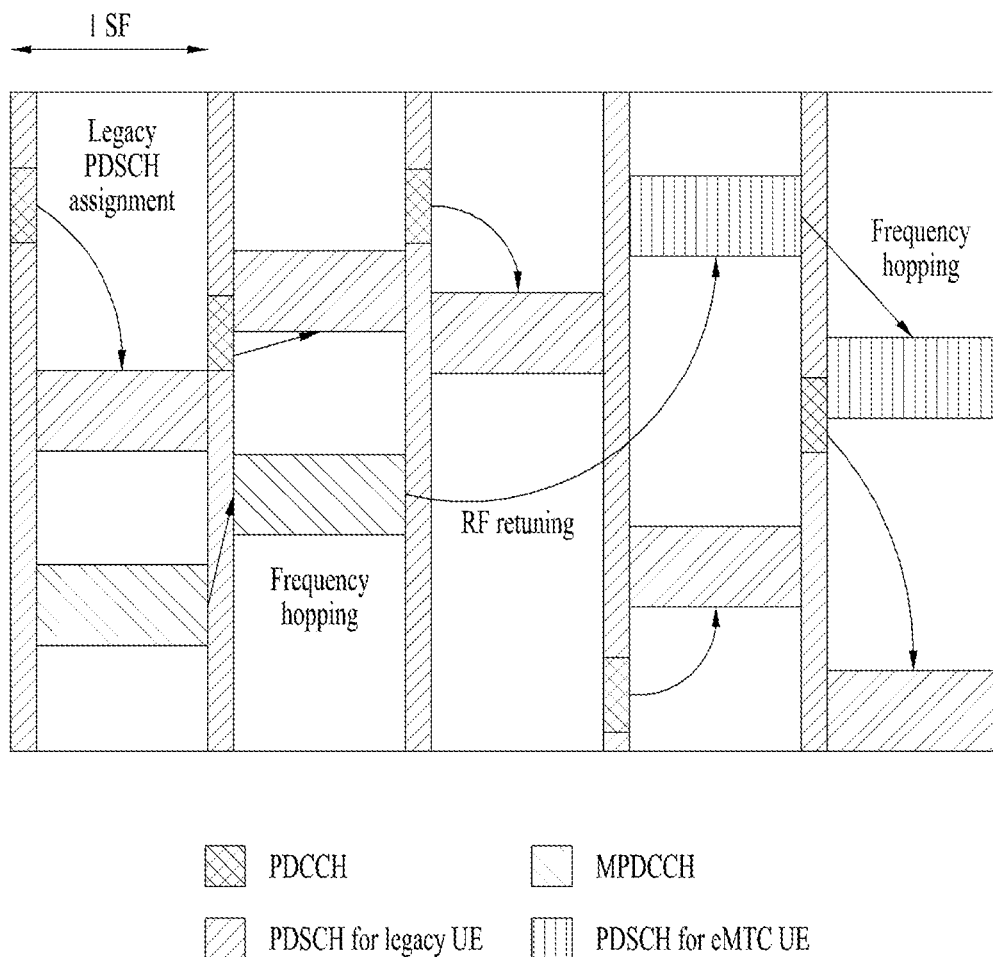
FIG. 15 illustrates an example of scheduling for each of MTC and legacy LTE.

FIG. 15 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH F. Narrowband-Internet of Things (NB-IoT)

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

1) Frame Structure and Physical Resource of NB-IoT

The NB-IoT frame structure may vary depending on subcarrier spacing.

Figure 16:
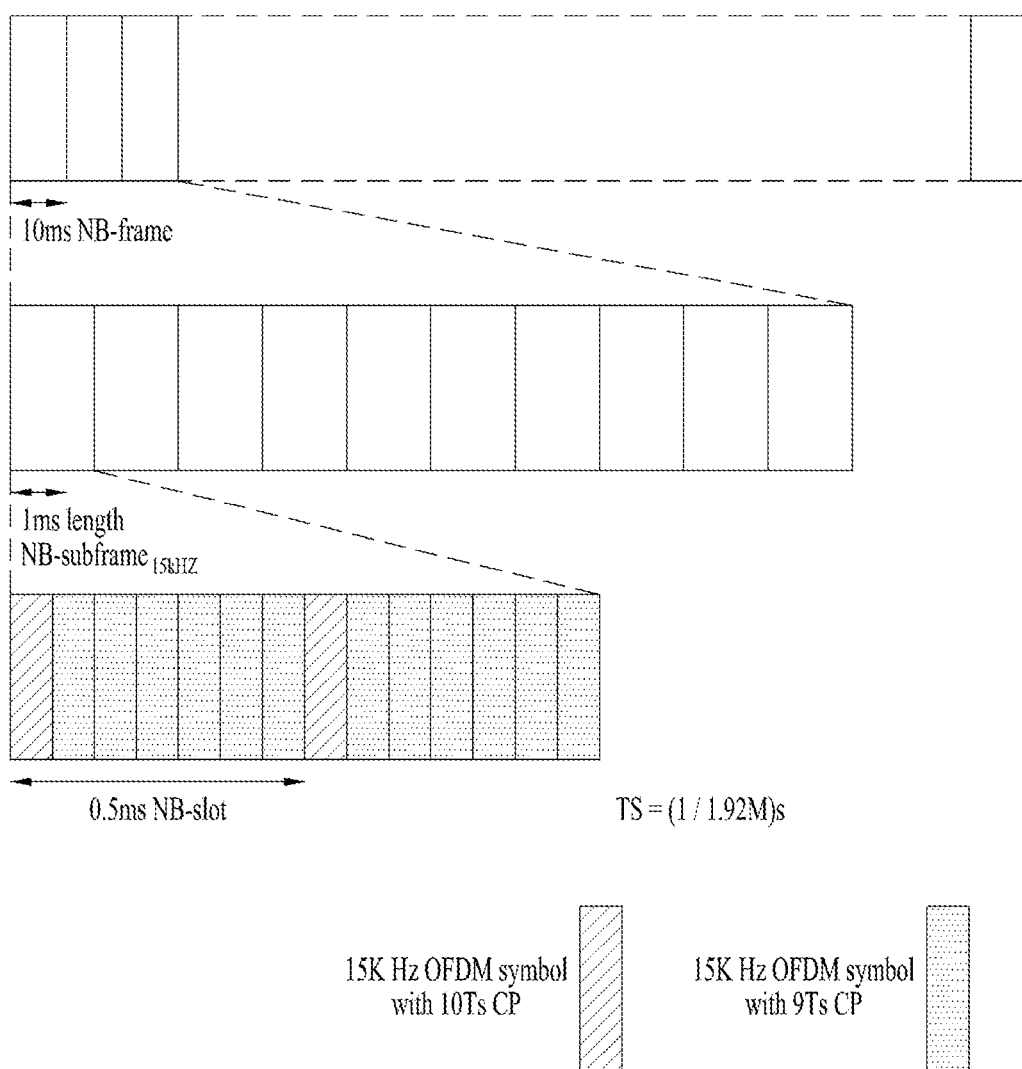
FIGS. 16 and 17 illustrate examples of NB-IoT frame structures according to subcarrier spacing.
Figure 17:
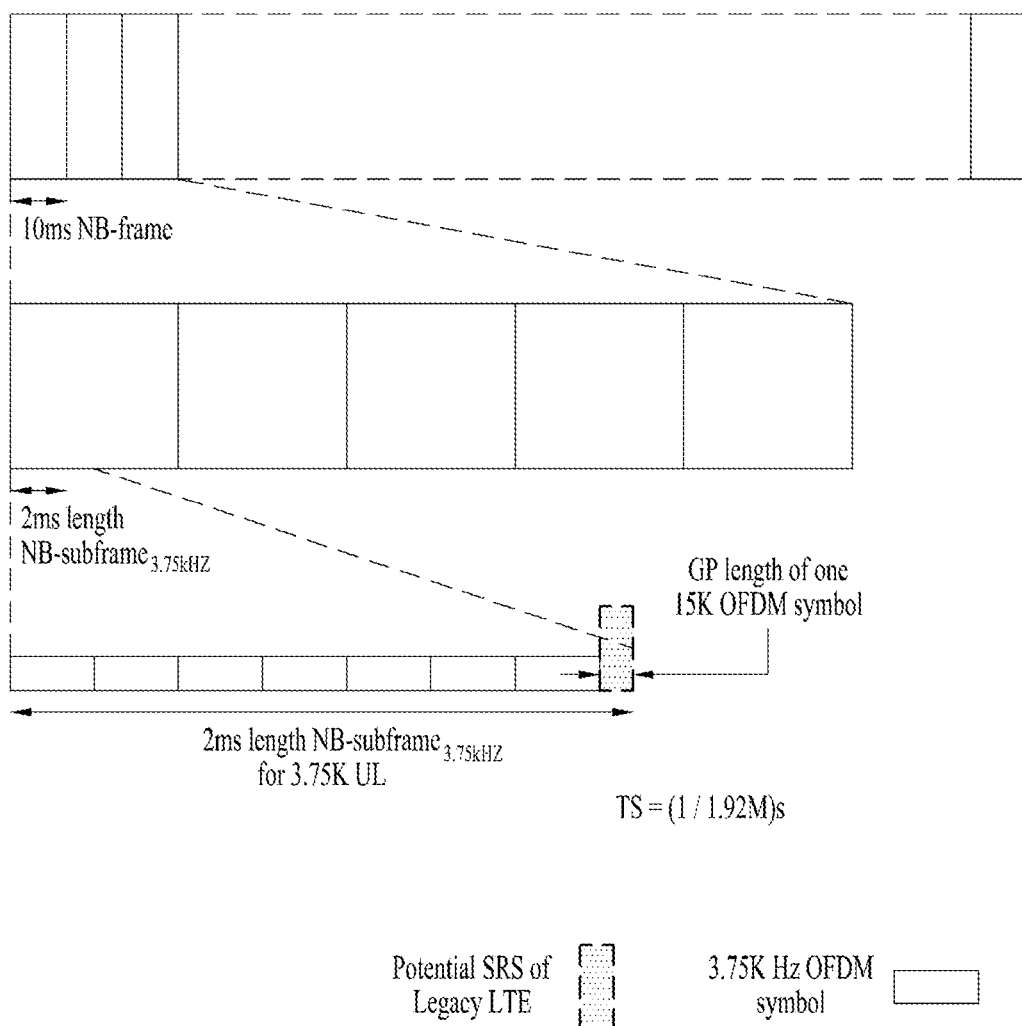

FIGS. 16 and 17 illustrate examples of NB-IoT frame structures according to subcarrier spacing (SCS). Specifically, FIG. 16 illustrates a frame structure with SCS of 15 kHz, and FIG. 17 illustrates a frame structure with SCS of 3.75 kHz. However, the NB-IoT frame structure is not limited thereto, and different SCS (e.g., 30 kHz, etc.) may be applied to the NB-IoT by changing the time/frequency unit.

Although the present disclosure describes the NB-IoT frame structure based on the LTE frame structure, this is merely for convenience of description and the present disclosure is not limited thereto. That is, the embodiments of the present disclosure are applicable to the NB-IoT based on the frame structure of the next-generation system (e.g., NR system).

Referring to FIG. 16, the NB-IoT frame structure for the 15 kHz subcarrier spacing is the same as the frame structure of the legacy system (LTE system). Specifically, a 10 ms NB-IoT frame may include 10 NB-IoT subframes of 1 ms each, and the 1 ms NB-IoT subframe may include two NB-IoT slots, each having a duration of 0.5 ms. Each 0.5 ms NB-IoT slot ms may include 7 OFDM symbols.

Referring to FIG. 17, a 10 ms NB-IoT frame may include five NB-IoT subframes of 2 ms each, and the 2 ms NB-IoT subframe may include 7 OFDM symbols and one guard period (GP). The 2 ms NB-IoT subframe may be expressed as an NB-IoT slot or an NB-IoT resource unit (RU).

Hereinafter, downlink and uplink physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 6 to one RB (i.e., one PRB) in the frequency domain.

Figure 18:
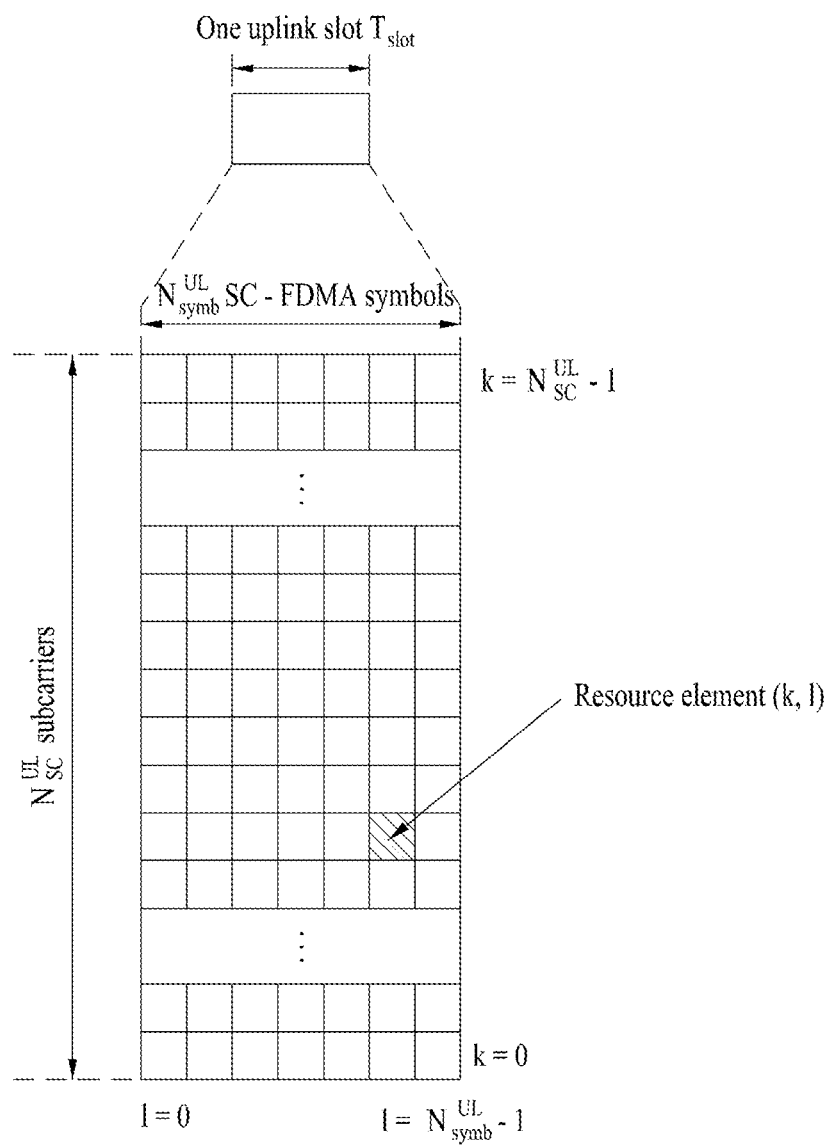
FIG. 18 illustrates an example of the resource grid for NB-IoT UL.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 18. The number of subcarriers $N_{sc}^{UL}$ and the slot period $T_{slot}$ may be given in Table 10 below.

FIG. 18 illustrates an example of the resource grid for NB-IoT uplink.

TABLE 10

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A resource unit (RU) for the NB-IoT uplink may include SC-FDMA symbols in the time domain and $N_{symb}^{UL} N_{slots}^{UL}$ a consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 11

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

TABLE 12

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

2) Physical Channels of NB-IoT

A base station and/or UE that support the NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format N0, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) Operation Mode of NB-IoT

Figure 19A:
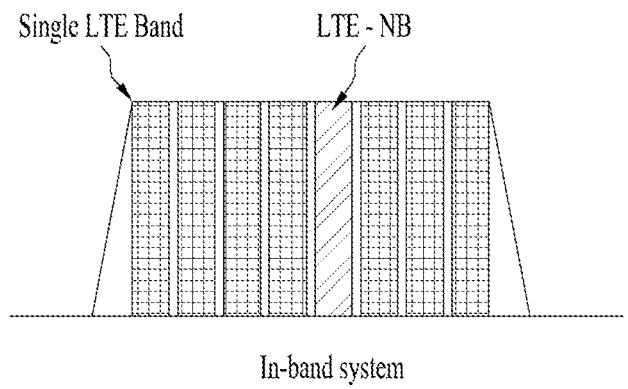
FIGS. 19A to 19C illustrate an examples of operation modes supported in the NB-IoT system.
Figure 19B:
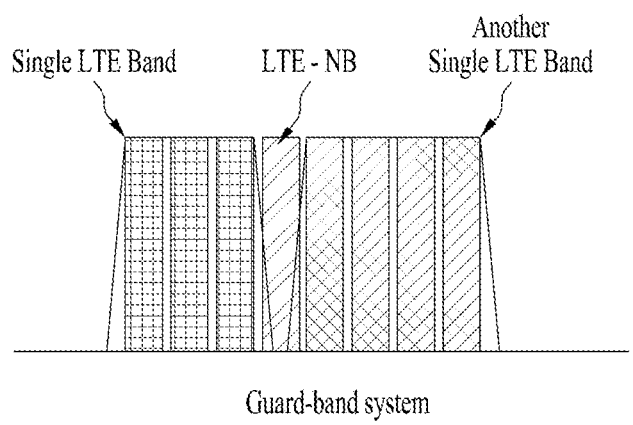
Figure 19C:
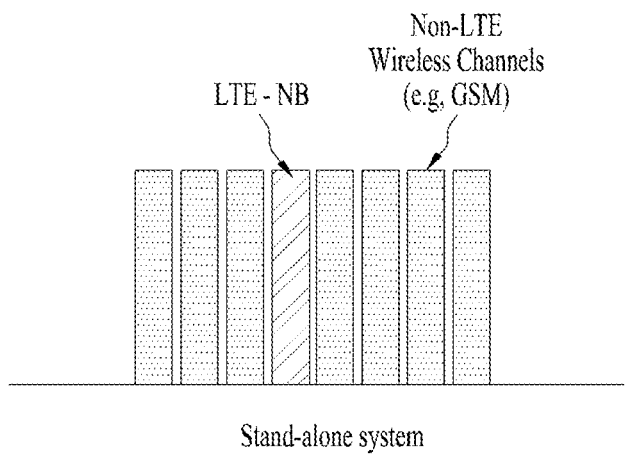

The operation mode of the NB-IoT will be described. The NB-IoT system may support three operation modes. FIGS. 19A to 19C illustrate an examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 19A illustrates an in-band system, FIG. 19B illustrates a guard-band system, and FIG. 19C illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

5) General Signal Transmission and Reception Procedure in NB-IoT

Figure 20:
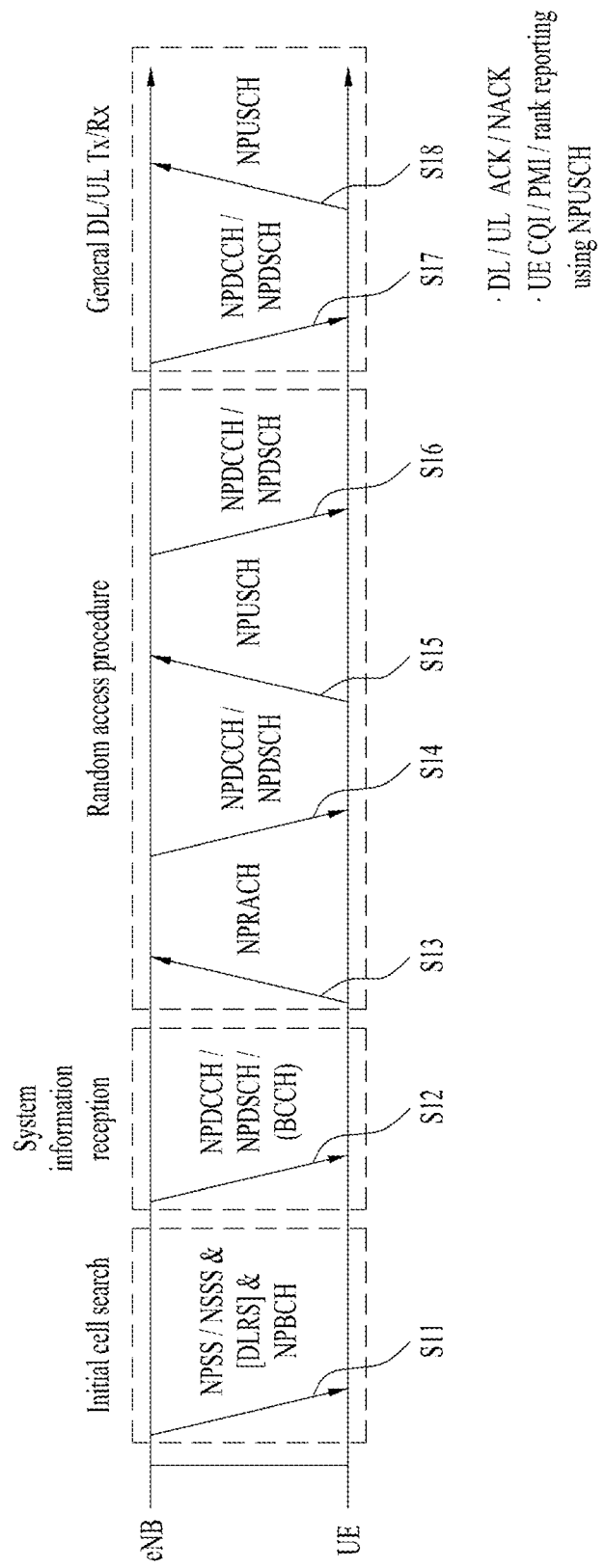
FIG. 20 illustrates an example of physical channels available in the NB-IoT and a general signal transmission method using the same.

FIG. 20 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 20 may be performed by the aforementioned wireless communication apparatuses (e.g., base station and UE in FIG. 11).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

6) Initial Access Procedure in NB-IoT

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

Figure 21:
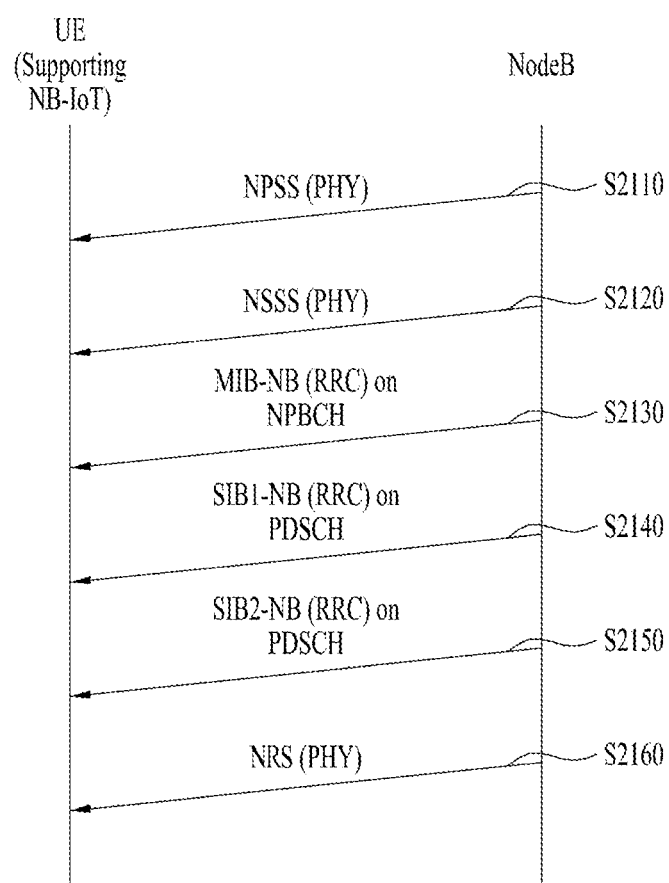
FIG. 21 illustrates an example of the initial access procedure in the NB-IoT.

FIG. 21 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 21.

FIG. 21 illustrates an example of the initial access procedure in the NB-IoT. The name of each physical channel and/or signal may vary depending on the wireless communication system to which the NB-IoT is applied. For example, although the NB-IoT based on the LTE system is considered in FIG. 21, this is merely for convenience of description and details thereof are applicable to the NB-IoT based on the NR system. The details of the initial access procedure are also applicable to the MTC.

Referring to FIG. 21, the NB-IoT UE may receive a narrowband synchronization signal (e.g., NPSS, NSSS, etc.) from the base station (S2110 and S2120). The narrowband synchronization signal may be transmitted through physical layer signaling.

The NB-IoT UE may receive a master information block (MIB) (e.g., MIB-NB) from the base station on an NPBCH (S2130). The MIB may be transmitted through higher layer signaling (e.g., RRC signaling).

The NB-IoT UE may receive a system information block (SIB) from the base station on an NPDSH (S2140 and S2150). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the BS (S2160), and this operation may be performed through physical layer signaling.

7) Random Access Procedure in NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

Figure 22:
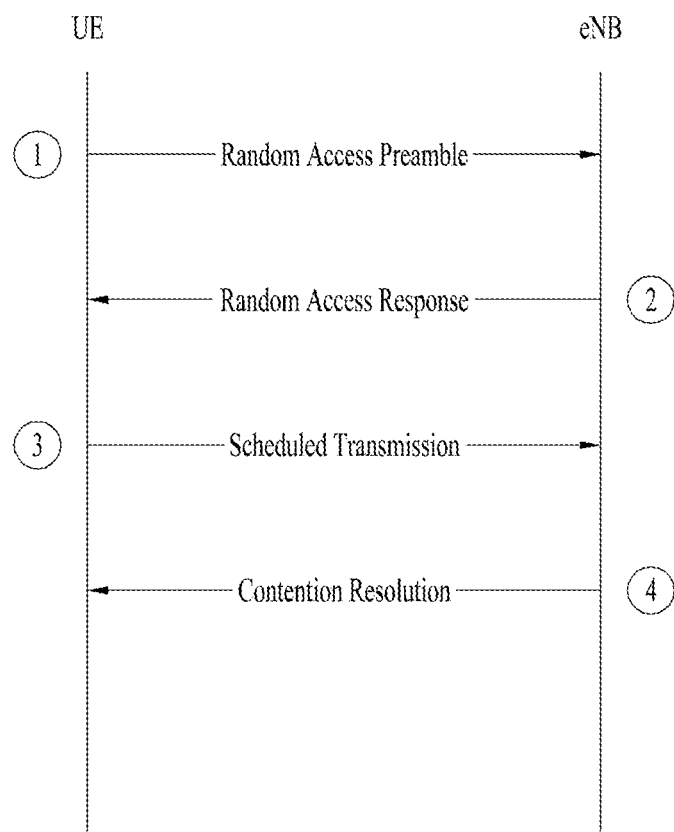
FIG. 22 illustrates an example of the random access procedure in the NB-IoT.

FIG. 22 illustrates a particular procedure for signaling between a UE and a base station (e.g., NodeB, eNodeB, eNB, gNB, etc.) for random access in the NB-IoT. In the following, detail of the random access procedure in the NB-IoT will be described based on messages (e.g., msg1, msg2, msg3, msg4) used therefor.

FIG. 22 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 22, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the base station on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the base station on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the base station. Then, the base station may transmit an associated contention resolution message (i.e., message 4, msg4) to the NB-IoT UE in order to inform that the random access procedure is successfully completed.

By doing the above, the base station and the NB-IoT UE may complete the random access.

8) DRX Procedure in NB-IoT

While performing the general signal transmission and reception procedure of the NB-IoT, the NB-IoT UE may transit to an idle state (e.g., RRC IDLE state) and/or an inactive state (e.g., RRC INACTIVE state) to reduce power consumption. The NB-IoT UE may be configured to operate in DRX mode after transiting to the idle state and/or the inactive state. For example, after transiting to the idle state and/or the inactive state, the NB-IoT UE may be configured to monitor an NPDCCH related to paging only in a specific subframe (frame or slot) according to a DRX cycle determined by the BS. Here, the NPDCCH related to paging may refer to an NPDCCH scrambled with a P-RNTI.

Figure 23:
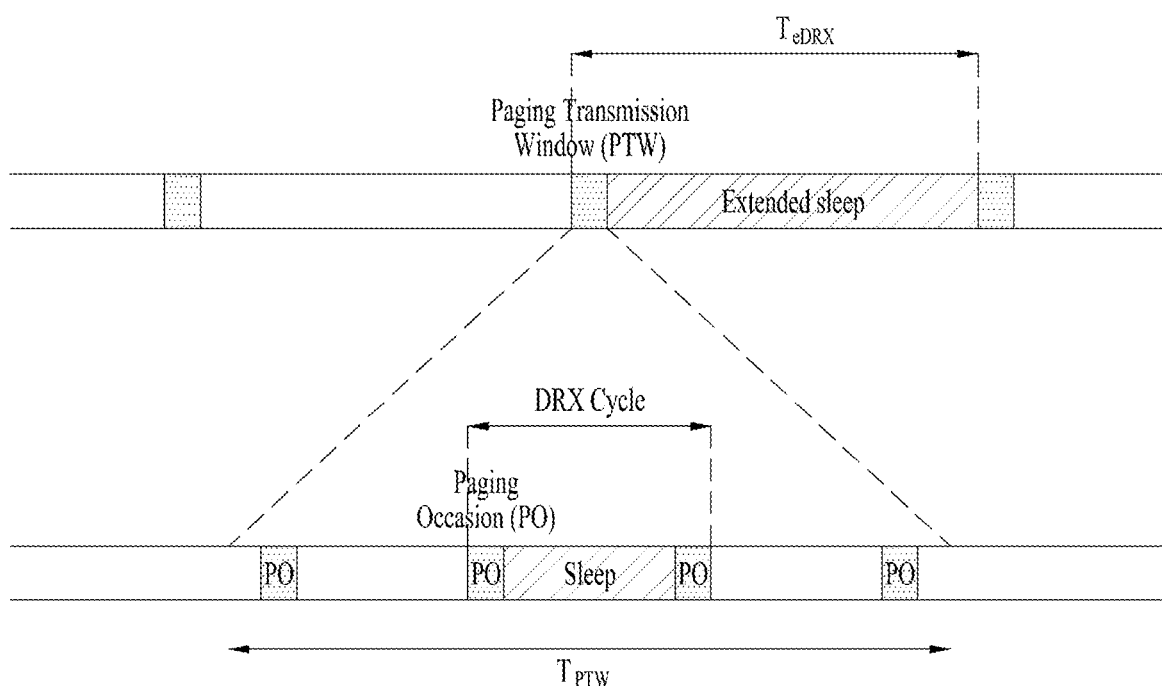
FIG. 23 illustrates an example of DRX mode in an idle state and/or an inactive state.

FIG. 23 illustrates an example of DRX mode in an idle state and/or an inactive state.

Figure 24:
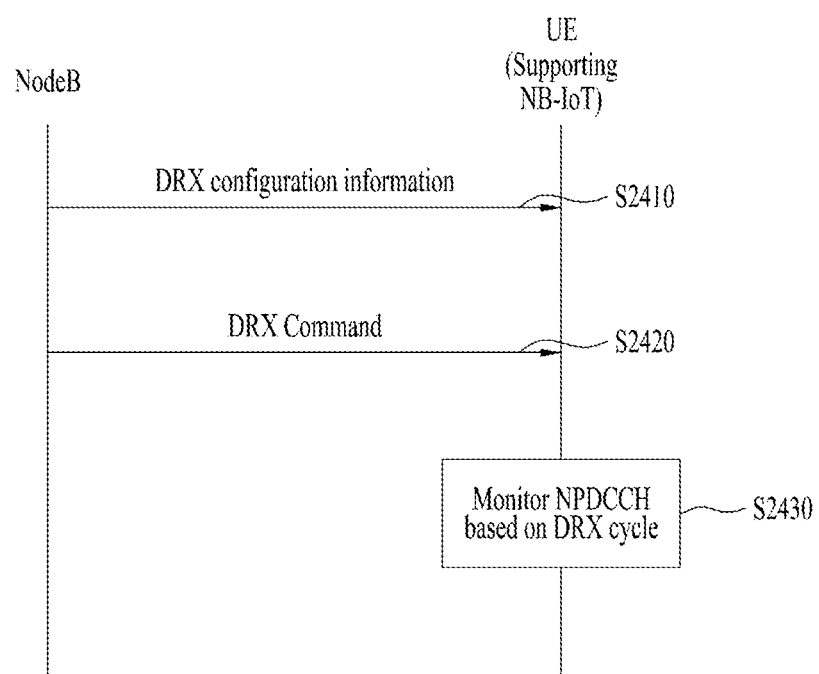
FIG. 24 illustrates an example of a DRX configuration and indication procedure for the NB-IoT UE.

A DRX configuration and indication for the NB-IoT UE may be provided as shown in FIG. 24. That is, FIG. 24 illustrates an example of a DRX configuration and indication procedure for the NB-IoT UE. However, the procedure in FIG. 24 is merely exemplary, and the methods proposed in the present disclosure are not limited thereto.

Referring to FIG. 24, the NB-IoT UE may receive DRX configuration information from the base station (e.g., NodeB, eNodeB, eNB, gNB, etc.) (S2410). In this case, the UE may receive the information from the base station through higher layer signaling (e.g., RRC signaling). The DRX configuration information may include DRX cycle information, a DRX offset, configuration information for DRX-related timers, etc.

Thereafter, the NB-IoT UE may receive a DRX command from the base station (S2420). In this case, the UE may receive the DRX command from the base station through higher layer signaling (e.g., MAC-CE signaling).

Upon receiving the DRX command, the NB-IoT UE may monitor an NPDCCH in a specific time unit (e.g., subframe, slot, etc.) based on the DRX cycle (S2430). The NPDCCH monitoring may mean a process of decoding a specific portion of the NPDCCH based on a DCI format to be received in a corresponding search space and scrambling a corresponding CRC with a specific predefined RNTI value in order to check whether the scrambled CRC matches (i.e. corresponds to) a desired value.

When the NB-IoT UE receives its paging ID and/or information indicating that system information is changed over the NPDCCH during the process shown in FIG. 24, the NB-IoT UE may initialize (or reconfigure) the connection (e.g., RRC connection) with the base station (for example, the UE may perform the cell search procedure of FIG. 20). Alternatively, the NB-IoT UE may receive (or obtain) new system information from the base station (for example, the UE may perform the system information acquisition procedure of FIG. 20).

G. Proposal for NPDCCH Transmission and Reception in Special Subframe

The structure and operation of a narrowband physical downlink control channel (NPDCCH) for transmitting information for a downlink (DL) control channel in the situation of frequency division duplex (FDD) were defined in the NB-IoT standardization up to 3GPP release 14. Basically, the NPDCCH may include one PRB in the frequency domain and one subframe in the time domain as a basic unit. Similar to other NB-IoT physical channels, the NPDCCH may be repeated for coverage enhancement.

In the FDD, one carrier may be configured for either DL or uplink (UL) over the entire time domain. In the case of a DL carrier, every available DL subframe has the same number of resource elements (REs). Meanwhile, in the TDD, one carrier may include a DL subframe, a UL subframe, and a special subframe, which are separated from each other in the time domain (e.g., see FIG. 4 and the description thereof). Thus, the number of simultaneously available DL subframes of the TDD is relatively insufficient as compared to that of the FDD, and it may cause performance degradation in terms of capacity, coverage, and/or latency.

In the TDD mode, the DwPTS region in the special subframe as well as the DL subframe may be used for DL data transmission. When the DwPTS region is used for the DL data transmission, the insufficient number of DL subframes may be compensated for. However, since the number of OFDM symbols available in the DwPTS region is generally smaller than that in the DL subframe, there may be a relatively small number of REs capable of data transmission. Accordingly, a configuration method, which is different from that for the DL subframe, is required for the DL data transmission in the DwPTS region.

Table 13 shows a special subframe configuration and the number of available REs according to the size of a control format indicator (CFI) for LTE control channel transmission. The CFI indicates the number of OFDM symbols used for control channel transmission and reception in one subframe (or the number of OFDM symbols in a control region). The CFI may be transmitted and received on the PCFICH (e.g., see FIG. 7 and the description thereof). The last row of Table 13 shows the number of available REs in the DL subframe for comparison. In Table 13, when 6 subcarriers are used, the number of REs is obtained by considering the use of one narrowband control channel element (NCCE), which is the basic unit of an NB-IoT control channel. In Table 13, when 12 subcarriers are used, the number of REs is obtained by considering the use of two NCCEs.

TABLE 13

| special subframe config- uration | OFDM symbol | # RE when 6 subcarrier is used | | | | # RE when 12 subcarrier is used | | | |
|---|---|---|---|---|---|---|---|---|---|
| | | CFI = 0 | 1 | 2 | 3 | 0 | 1 | 2 | 3 |
| 0 | 3 | 18 | 12 | 6 | | 36 | 24 | 12 | |
| 1 | 9 | 54 | 48 | 42 | | 108 | 96 | 84 | |
| 2 | 10 | 60 | 54 | 48 | | 120 | 108 | 96 | |
| 3 | 11 | 66 | 60 | 54 | | 132 | 120 | 108 | |
| 4 | 12 | 72 | 66 | 60 | | 144 | 132 | 120 | |
| 5 | 3 | 18 | 12 | 6 | | 36 | 24 | 12 | |
| 6 | 9 | 54 | 48 | 42 | | 108 | 96 | 84 | |
| 7 | 10 | 60 | 54 | 48 | | 120 | 108 | 96 | |
| 8 | 11 | 66 | 60 | 54 | | 132 | 120 | 108 | |
| 9 | 6 | 36 | 30 | 24 | | 72 | 60 | 48 | |
| 10 | 6 | 36 | 30 | 24 | | 72 | 60 | 48 | |
| DL subframe | 14 | 84 | 78 | 72 | 66 | 168 | 156 | 144 | 132 |

To solve the above problem, the present disclosure proposes conditions and methods for transmitting the NPDCCH in the DwPTS region. However, it is apparent that the present disclosure is applicable to other channels (e.g., NPDSCH) capable of data transmission besides the NPDCCH. Although the proposed methods according to the present disclosure are described for methods supporting NB-IoT operating in the TDD mode, the present disclosure is generally applicable to other cases where the DwPTS region is used in the TDD mode unless the spirit of the present disclosure is violated. In addition, although the present disclosure describes the proposed methods based on the assumption that the DwPTS region is used in the TDD mode, the present disclosure is generally applicable when each transmission unit has a different number of available symbols (for example, when there are two (resource) units: units X and Y, which are separated in the time and/or frequency domain, and when Nx symbols are available in unit X and NY symbols are available in unit Y, where an example of the (resource) unit may be a subframe). Moreover, although the present disclosure assumes that the subframe is used as one transmission unit for convenience of description, the present disclosure is generally applicable to other transmission units with different sizes (e.g., a unit composed of one or more symbols such as a frame, a slot, etc.) besides the subframe. The methods proposed in the present disclosure may be combined and used unless they collide with each other.

In the present specification, the special subframe may refer to a specific subframe including a downlink period, a guard period, an uplink period (e.g., see FIG. 4 and the description thereof). Thus, the DwPTS (or DwPTS region) of the special subframe may refer to as the downlink period of the specific subframe, and the UpPTS (or UpPTS region) of the special subframe may refer to the uplink period of the specific subframe. Herein, the special subframe may be referred to as a TDD special subframe.

G.1 Search Space Configuration without DwPTS (Method 1) the DwPTS is not Included in the Search Space Configuration for Npdcch Transmission.

Since the DwPTS region generally has an insufficient number of available REs compared to the DL subframe, decoding performance may be relatively degraded when the same data is transmitted. This may cause reception performance to vary depending on which subframe the UE monitors. In addition, when transmission is repeated, subframes may have different numbers of available REs. In this case, if scheduling or rate-matching is applied by considering the different numbers of available REs, receiver complexity may increase.

To solve such problems, Method 1 proposed in the present disclosure may be used. When Method 1 is used, the UE does not need to consider a difference between the number of REs in the DwPTS region and the number of REs in the DL subframe, thereby providing an improvement of reducing the UE complexity.

When Method 1 is used, a search space for monitoring the NPDCCH may be composed of only consecutive valid DL subframes. In this case, the special subframe is not included in the search space configuration. Thus, the UE may determine the configuration of the search space based on only normal DL subframes and monitor the determined search space. In the present specification, the valid DL subframe may correspond to a subframe indicated as the DL subframe for the NB-IoT by system information (e.g., SIB1-NB) or higher layer signaling (e.g., RRC singling) and refer to a subframe that does not include a narrowband primary synchronization signal (NPSS), a narrowband secondary synchronization signal (NSSS), a narrowband physical broadcast channel (NPBCH), and system information block type 1-narrowband (SIB1-NB).

Figure 25A:
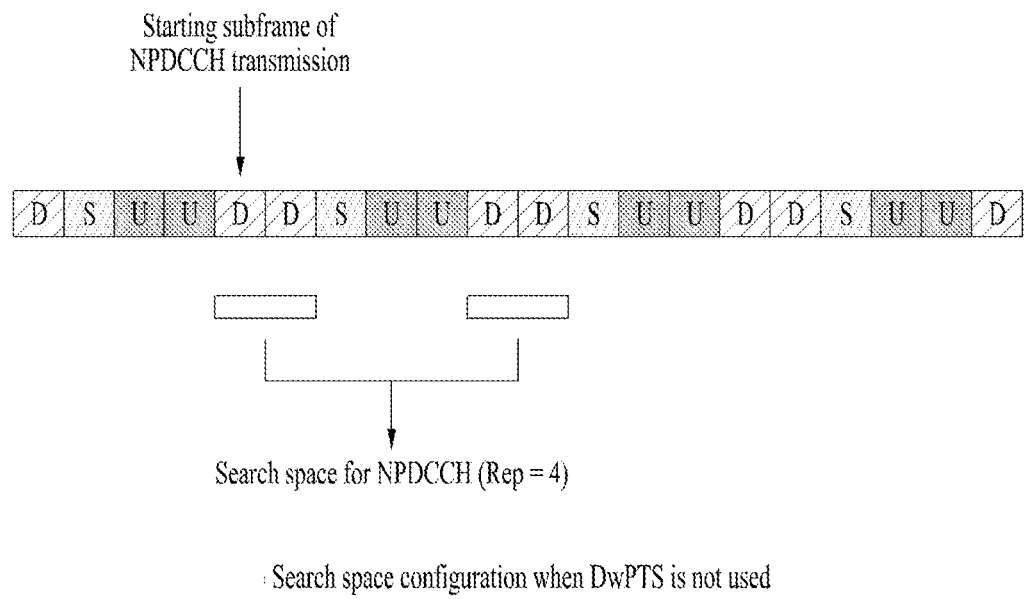
FIG. 25A to FIG. 29B illustrate cases in which the methods according to the present disclosure are applied.
Figure 25B:
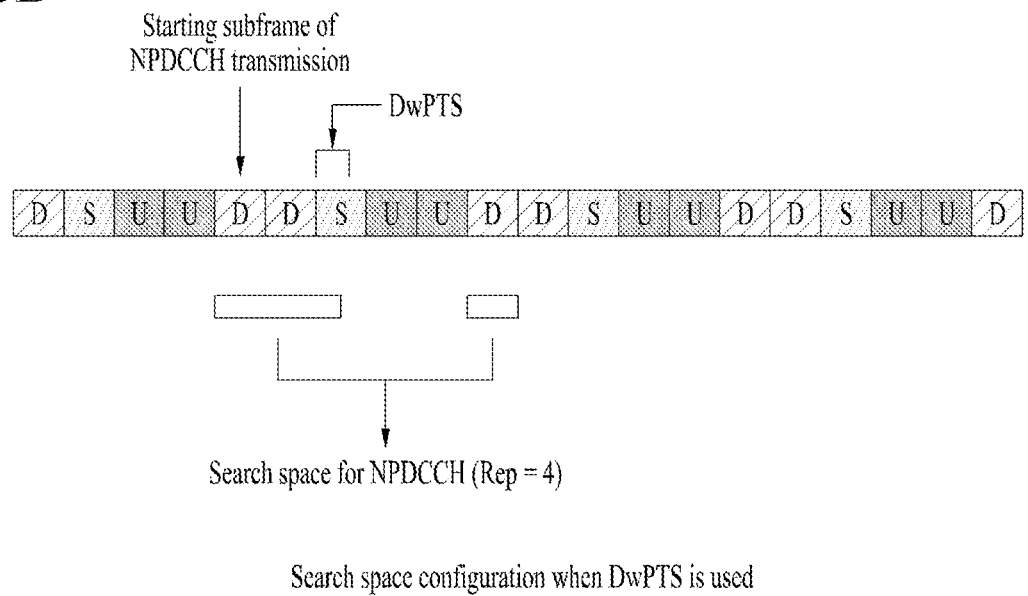

FIGS. 25A and 25B illustrate a case in which Method 1 of the present disclosure is applied.

Although FIGS. 25A and 25B assumes that every DL subframe is valid for convenience, the present disclosure is equally or similarly applicable when an invalid subframe is included. If some subframes are invalid, the search space according to Method 1 of the present discourse may be configured to include consecutive valid DL subframes except the invalid subframes. Although FIGS. 25A and 25B assumes that the repetition number of the NPDCCH is 4 (Rep=4), this is merely exemplary and the present disclosure is equally or similarly applicable when a repetition number other than 4 is given.

FIG. 25A shows an example of Method 1. As shown in FIG. 25A, when the starting subframe of the NPDCCH transmission and the repetition number are given, the search space may be composed of consecutive valid DL subframes. Referring to FIG. 25A, the search space for the NPDCCH may include four consecutive valid DL subframes (D, D, D, D) from the starting subframe of the NPDCCH transmission except the special subframe (S) since the NPDCCH search space includes no special subframe according to Method 1 of the present disclosure.

As an opposite example, FIG. 25(b) shows a case in which the DwPTS is included in the search space configuration for the NPDCCH transmission. Referring to FIG. 25B, the search space for the NPDCCH may be composed of four consecutive valid DL subframes (D, D, S, D) including the DwPTS in the special subframe (S) since the special subframe is included in the search space for the NPDCCH contrary to Method 1 of the present disclosure.

Whether Method 1 of the present disclosure is applied may be determined by specific conditions. The specific conditions may be determined by combining at least one of Method 1-1 to Method 1-5.

(Method 1-1) The application of Method 1 may be determined based on the configuration of the special subframe.

The number of available OFDM symbols in the DwPTS region may be used as the configuration of the special subframe. In this case, the UE may implicitly determine whether the DwPTS region is available without additional signaling. In addition, the number of available REs may be determined by the number of available OFDM symbols in the DwPTS. The number of available REs may need to be considered since it affects the use of the DwPTS region, transmission efficiency, and decoding performance. A ratio of the number of available REs in the DL subframe and the number of available REs in the DwPTS region may be used as the configuration of the special subframe. To calculate the number of available OFDM symbols in the DwPTS region, special subframe configuration information (e.g., special subframe configurations 0 to 10 in Table 13), information for the number of OFDM symbols for an LTE control channel (e.g., CFI information), and/or information for the NB-IoT operation mode (e.g., see FIGS. 19A to 19C and the description thereof) may be used. For example, when the number of available OFDM symbols in the DwPTS region, which is calculated based on the above information, is more than or equal to a specific value, the DwPTS region may be determined to be included in the search space configuration for the NPDCCH transmission. Otherwise, the DwPTS region may be determined not to be included in the search space configuration for the NPDCCH transmission.

(Method 1-2) The application of Method 1 may be determined by higher layer signaling.

The higher layer signaling may refer to cell-common system information that the UE may obtain in the idle mode such as the system information block (SIB). In this case, the higher layer signaling may inform whether the UE needs to monitor the DwPTS in monitoring the NPDCCH in a common search space (CSS). Alternatively, the higher layer signaling may refer to dedicated RRC signaling that the UE is capable of obtaining while transitioning to the connected mode. In this case, the higher layer signaling may be used to consider a case in which UEs have different capabilities and different channel states. For example, in the case of the CSS, when Method 1 of the present disclosure is applied and when the base station informs some UEs that the DwPTS region is available through RRC signaling, the UE may determine to include the DwPTS region in the search space configuration for the NPDCCH transmission while monitoring a UE-specific search space (USS).

(Method 1-3) The application of Method 1 may be determined by Rmax configured for the corresponding search space.

If the value of Rmax is less than or equal to a specific value, Method 1 may be applied. Otherwise, Method 1 may not be applied. When Rmax has a small value, the effect of the DwPTS having a relatively small number of REs may increase due to insufficient repetitions, compared to that when the Rmax has a large value. Here, Rmax indicates the maximum number of repetitions for the NPDCCH search space and may be configured through higher layer signaling (e.g., RRC layer signaling).

(Method 1-4) The application of Method 1 may be determined according to whether NRS transmission is performed in a DL subframe immediately before the corresponding DwPTS.

Whether Method 1 is applied to a specific DwPTS may be determined according to whether an NRS is included in a DL subframe immediately before the corresponding DwPTS region. For example, when the NRS is transmitted in the DL subframe immediately before the specific DwPTS region, the corresponding DwPTS region may be included in the search space configuration for the NPDCCH transmission. Otherwise, Method 1 may be applied. Such scheme is to allow the DwPTS to be used only when cross-subframe channel estimation, which is used to improve decoding performance in the NB-IoT, is easily applied. In this case, the NRS of which the transmission is determined may be limited to an NRS that may be recognized by the UE which expects NPDCCH reception.

(Method 1-5) The NRS may be transmitted in the DwPTS even though the corresponding DwPTS is not used for the NPDCCH transmission.

In the NB-IoT, the cross-subframe channel estimation may be considered to improve channel estimation accuracy. In this case, the channel estimation accuracy may generally increase as the number of subframes in which a reference signal is expected increases.

To this end, Method 1-5 of the present disclosure proposes to transmit the NRS in the DwPTS region even through the DwPTS region is not included in the search space configuration for the NPDCCH transmission. Although this proposed method describes the NRS transmission, the method is equally applicable to determine CRS transmission when the operation mode is the in-band mode and the CRS transmission is configurable in the DwPTS region.

Method 1-5 may be applied only when the corresponding DwPTS region is configured to be valid for NB-IoT DL data transmission. If the corresponding DwPTS region is invalid, it may be used for other purposes (e.g., scheduling for the legacy LTE), and in this case, the NRS transmission may not be suitable.

For a search space in which the NPDCCH is actually transmitted, Method 1-5 may be applied to DwPTSs located between a DL subframe in which the NRS transmission starts and a DL subframe in which the NRS transmission ends. The reason for this is to prevent the NRS from being transmitted unnecessarily in a region in which no NPDCCH is transmitted.

Figure 26:
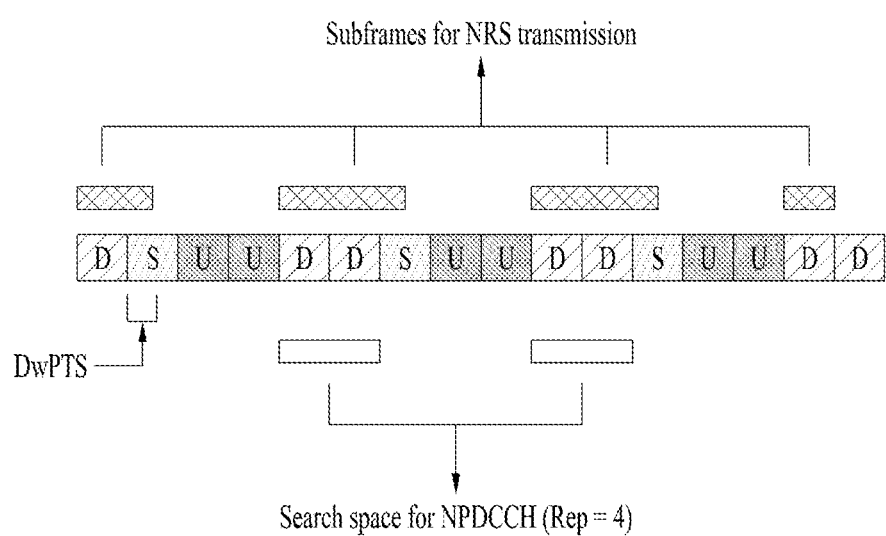

FIG. 26 shows an example of Method 1-5. Although FIG. 26 assumes that every DL subframe is valid for convenience, the present disclosure is equally or similarly applicable when an invalid subframe is included. If some subframes are invalid, the search space according to the present discourse may be configured to include consecutive valid DL subframes except the invalid subframes. Although FIGS. 25A and 25B assumes that the repetition number of the NPDCCH is 4 (Rep=4), this is merely exemplary and the present disclosure is equally or similarly applicable when a repetition number other than 4 is given. Referring to FIG. 26, the search space for the NPDCCH may be configured to include four consecutive valid DL subframes (D, D, D, D) except the special subframe (S) according to Method 1 of the present disclosure. However, according to Method 1-5 of the present disclosure, the NRS may be transmitted in the DwPTS of the special subframe (S).

G.2 Search Space Configuration with DwPTS

Method 1 of the present disclosure is advantageous in that it may prevent an increase of the UE complexity which may occur due to the use of the DwPTS region and simplify operation by excluding the use of the DwPTS region when the use of the DwPTS region is restricted in a specific situation. However, since the DwPTS is not used for DL data transmission, there may be a loss in transmission efficiency.

(Method 2) The DwPTS is included in the search space configuration for the NPDCCH transmission.

Figure 27:
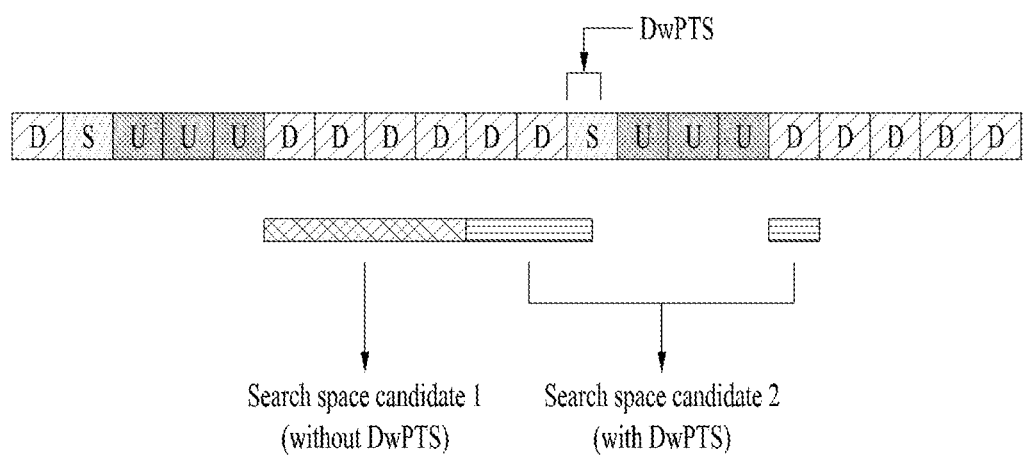

To improve the transmission efficiency, a structure in which the DwPTS region is included in the search space configuration for the NPDCCH transmission may be considered as proposed by Method 2. FIG. 27 illustrates a search space including the DwPTS and a search space including no DwPTS as an example of the search space of the TDD based NB-IoT. Although FIG. 27 assumes that every DL subframe and the DwPTS region are valid for convenience, the present disclosure is equally or similarly applicable when an invalid subframe is included. If some subframes are invalid, the search space according to the present discourse may be configured to include consecutive valid DL subframes except the invalid subframes. Although FIG. 27 assumes that the repetition number of the NPDCCH is 4 (Rep=4), this is merely exemplary and the present disclosure is equally or similarly applicable when a repetition number other than 4 is given.

As described above, in the present specification, the valid DL subframe may correspond to a subframe indicated as the DL subframe for the NB-IoT by system information (e.g., SIB1-NB) or higher layer signaling (e.g., RRC singling) and refer to a subframe that does not include an NPSS, an NSSS, an NPBCH, and SIB1-NB.

Whether Method 2 of the present disclosure is applied may be determined by specific conditions. The specific conditions may be determined by combining at least one of Method 1-1, Method 1-2, and Method 1-3. In this case, "Method 1" mentioned in Method 1-1, Method 1-2, and Method 1-3 may be replaced with "Method 2".

(Method 2-1) The search space including the DwPTS is not used for the NPDCCH transmission.

As described in section G.1, since the DwPTS region generally has an insufficient number of available REs compared to the DL subframe, decoding performance may be relatively degraded when the same data is transmitted. To solve the above problem, Method 2-1 of the present disclosure proposes that the UE expects no NPDCCH transmission in the search space including the DwPTS (or special subframe).

According to Method 2-1 of the present disclosure, when a search space candidate configured for the UE includes the DwPTS (or special subframe), the UE may skip monitoring the NPDCCH (or may not perform monitoring the NPDCCH) in the corresponding search space candidate. On the other hand, when the search space candidate configured for the UE includes no DwPTS (or no special subframe), the UE may monitor the NPDCCH in the corresponding search space candidate.

For example, when there are search space candidate 1 with no DwPTS region and search space candidate 2 with the DwPTS region as shown in FIG. 27, the UE may be configured to expect no NPDCCH transmission in search space candidate 2. Thus, the UE may perform the NPDCCH monitoring in search space candidate 1 and skip the NPDCCH monitoring (or may not perform the NPDCCH monitoring) in search space candidate 2. Although FIG. 27 assumes that there are two search space candidates, this is merely exemplary and the present disclosure is equally or similarly applicable when the number of search space candidates is not 2.

(Method 2-1-1) the Application of Method 2-1 May be Determined Based on the Configuration of the Special Subframe.

The configuration of the special subframe may be determined by the number of available OFDM symbols in the DwPTS region. In this case, the UE may implicitly determine whether the DwPTS region is available without additional signaling. In addition, the number of available REs may be determined by the number of available OFDM symbols in the DwPTS. The number of available REs may need to be considered since it affects the use of the DwPTS region, transmission efficiency, and decoding performance. To calculate the number of available OFDM symbols in the DwPTS region, special subframe configuration information (e.g., special subframe configurations 0 to 10 in Table 13), information for the number of OFDM symbols for an LTE control channel (e.g., CFI information), and/or information for the NB-IoT operation mode (e.g., see FIGS. 19A to 19C and the description thereof) may be used. For example, when the number of available OFDM symbols in the DwPTS region, which is calculated based on the above information, is more than or equal to a specific value, the DwPTS region may be determined to be included in the search space configuration for the NPDCCH transmission. Otherwise, the DwPTS region may be determined not to be included in the search space configuration for the NPDCCH transmission.

(Method 2-1-2) The application of Method 2-1 may be determined by higher layer signaling.

The higher layer signaling may refer to cell-common system information that the UE may obtain in the idle mode such as the system information block (SIB). In this case, the higher layer signaling may inform whether the UE needs to monitor the DwPTS when monitoring the NPDCCH in a common search space. Alternatively, the higher layer signaling may refer to dedicated RRC signaling that the UE is capable of obtaining while transiting to the connected mode. This is to consider a case in which UEs have different capabilities and different channel states. For example, Method 2-1 of the present disclosure is applied in the case of the CSS, and when monitoring a UE-specific search space (USS), the UE may determine to monitor a search space including the DwPTS region when the base station informs some UEs that the DwPTS region is available through RRC signaling.

(Method 2-1-3) The application of Method 2-1 may be determined according to Rmax configured for the corresponding search space.

If the value of Rmax is less than or equal to a specific value, Method 2-1 may be applied. Otherwise, Method 2-1 may not be applied. When Rmax has a small value, the effect of the DwPTS having a relatively small number of REs may increase due to insufficient repetitions, compared to that when the Rmax has a large value. Here, Rmax indicates the maximum number of repetitions for the NPDCCH search space and may be configured through higher layer signaling (e.g., RRC layer signaling).

(Method 2-1-4) The application of Method 2-1 may be determined according to the value of R, which indicates how many times the NPDCCH is actually repeated.

When R has one or more values actually available for the NPDCCH transmission with respect to one Rmax value, and when there are multiple search space candidates respectively corresponding to the values of R, Method 2-1 may be applied to only search space candidates where R is less than or equal to a specific value and Method 2-1 may not be applied to the remaining candidates.

For example, assuming that a set of R values available for a specific Rmax value is {R1, R2, R3, R4} and only a value of R1 is less than or equal to a predetermined specific value, Method 2-1 may be applied to only search space candidates where the number of repetitions is R1, and Method 2-1 may not be applied to other search space candidates where the number of repetitions is not R1. When Method 2-1 is applied, the UE does not expect NPDCCH transmission (or skips the NPDCCH monitoring or does not perform the NPDCCH monitoring) in the search space including the DwPTS. When Method 2-1 is not applied, the UE may perform the NPDCCH monitoring since the UE expects the NPDCCH transmission in the search space including the DwPTS.

As described above, Rmax indicates the maximum number of repetitions for the NPDCCH search space and may be configured through higher layer signaling (e.g., RRC layer signaling). R indicates the repetition number or level of the NPDCCH, and the value of R may be determined by Rmax. For example, when the value of Rmax is 1, the available value of R may be determined as 1. When the value of Rmax is 2, the available values of R may be determined as 1 and 2. When the value of Rmax is 4, the available values of R may be determined as 1, 2, and 4. When the value of Rmax is more than or equal to 8, the available values of R may be determined as Rmax/8, Rmax/4, Rmax/2, and Rmax.

Figure 28:
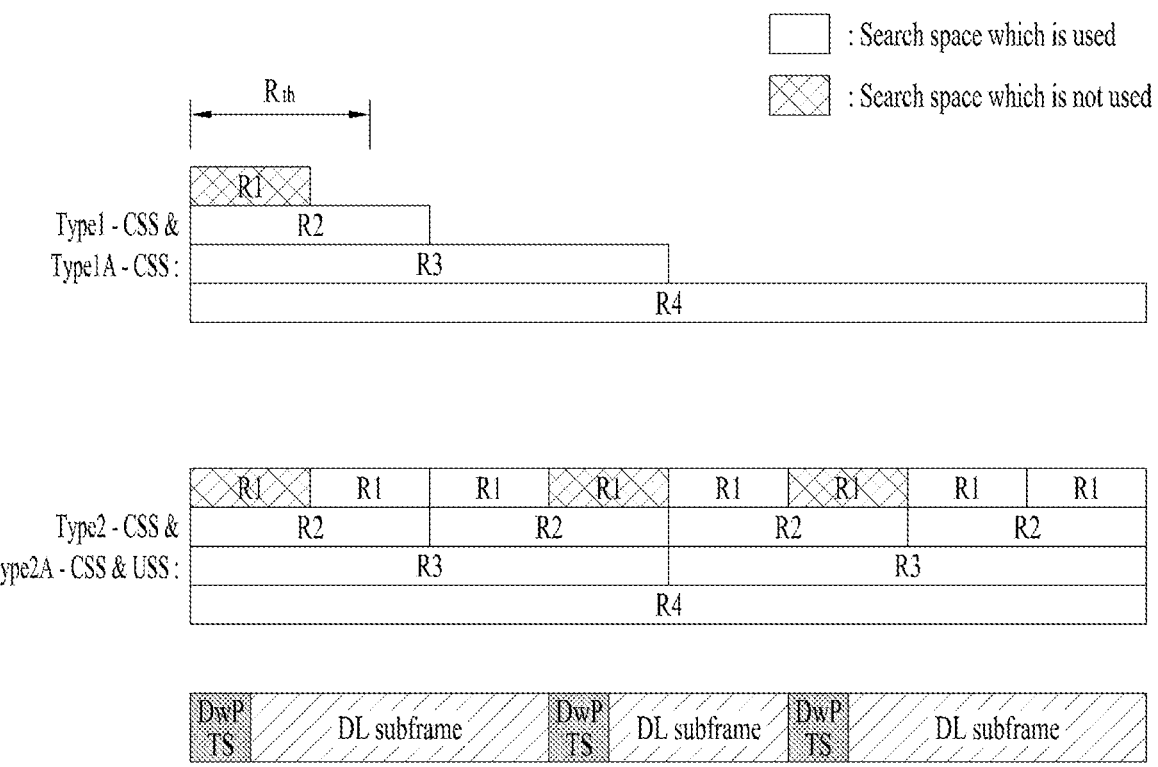

FIG. 28 illustrates an example of Method 2-1-4 of the present disclosure. In FIG. 28, Rth represents a specific value for determining whether Method 2-1 is applied. Among available NPDCCH repetition numbers, only R1 has a value less than (or equal to) Rth. If a search space with a length of R1 includes the DwPTS, the corresponding search space may be determined not to be used for the NPDCCH transmission. If the search space with the R1 length includes no DwPTS region, the search space may be used for the NPDCCH transmission.

In a type1 common search space (type1-CSS), an NPDCCH for receiving a paging message (or an NPDCCH with a CRC scrambled with a P-RNTI) may be configured. The UE may monitor the NPDCCH for receiving the paging message (or the NPDCCH with the CRC scrambled with the P-RNTI) in the type-1 CSS. In a type1A-CSS, an NPDCCH for transmitting a single cell point-to-multipoint (SC-PTM) control channel (or an NPDCCH with a CRC scrambled with a single cell-RNTI (SC-RNTI)) may be configured. The UE may monitor the NPDCCH for transmitting the SC-PTM control channel (or the NPDCCH with the CRC scrambled with the SC-RNTI) in the type1A-CSS. Here, the SC-RNTI refers to an RNTI used to identify a single cell multicast control channel (SC-MCCH) or SC-MCCH change notification. In a type2-CSS, an NPDCCH for a random access procedure may be configured. The UE may monitor the NPDCCH for random access procedure in the type2-CSS. Here, the NPDCCH for the random access procedure refers to a NPDCCH used while the random access procedure is performed and may include an NPDCCH with a CRC scrambled with an RA-RNTI and/or a C-RNTI. In a type2A-CSS, an NPDCCH for transmitting an SC-PTM traffic channel (or a PDCCH with a CRC scrambled with a group-RNTI (G-RNTI)). The UE may monitor the NPDCCH for transmitting the SC-PTM traffic channel (or the NPDCCH with the CRC scrambled with the G-RNTI) in the type2A-CSS. Here, the G-RNTI refers to an RNTI used to identify a single cell multicast traffic channel (SC-MTCH) or SC-MCCH change notification. In the user-specific search space (USS), an NPDCCH for transmitting a UE-specific NPDSCH (or an NPDCCH with a CRC scrambled with a C-RNTI) may be configured. The UE may monitor the NPDCCH for transmitting the UE-specific NPDSCH (or the NPDCCH with the CRC scrambled with the C-RNTI) in the USS.

Figure 29A:
Figure 29B:
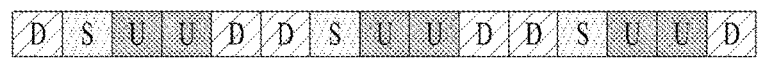

FIGS. 29A and 29B illustrate an example of Method 2-1-4 in consideration of the TDD structure. Although FIGS. 29A and 29B assume that Method 2-1 is applied when Rep=2 or less (or when the value of R is less than or equal to 2), this is merely exemplary and the present disclosure is equally or similarly applicable to the other values. In FIGS. 29A and 29B, boxes denoted by the same alphabet indicate distributed blocks included in a single search space, and Rep denotes the value of R.

Referring to FIG. 29A, although the R value for search space a is less than 2 (Rep=1), Method 2-1 is not applied since search space a is configured without DwPTS. Thus, the UE performs the NPDCCH monitoring in search space a. Since the R value for search space b is 2 (Rep=2) and the search space includes the DwPTS, Method 2-1 is applied. Thus, the UE does not expect NPDCCH transmission (or skips the NPDCCH monitoring or does not perform the NPDCCH monitoring) in search space b.

In Method 2-1-4, Rth, the number of repetitions used as a criteria for determining whether Method 2-1 is applied, may be determined by combining at least one of the following options.

(Option 2-1-4a) The value of Rth may be set to a fixed value defined in the standards. For example, the value of Rth may be fixed to 1 or 2 where the effect of an increase in the code rate is severe due to a relatively insufficient number of REs. Option 2-1-4a is advantageous in that there is no extra signaling overhead.

(Option 2-1-4b) The value of Rth may be indicated by the base station through higher layer signaling. Option 2-1-4b is advantageous in that the base station may configure DwPTS-related operation flexibly depending on situations.

(Option 2-1-4c) The value of Rth may be implicitly determined by a specific value of Rmax. For example, the value of Rth may be set to the smallest one among available repetition numbers related to the specific Rmax value. As another example, the value of Rth may be determined from a table or equation defined in the standards which uses Rmax as a variable. Option 2-1-4c is advantageous in that there is no extra signaling overhead.

(Option 2-1-4d) The value of Rth may be determined such that it is applied only when the value of Rmax is more than or equal to a specific value. In the case of the type2-CSS, type2A-CSS, and USS, if the actual minimum number of repetitions is more than or equal to Rmax/8 and Rmax is more than or equal to a prescribed value, the actual minimum number of repetitions may be determined large enough to cancel the effect of the DwPTS.

(Method 2-2) When the search space including the DwPTS is configured, aggregation level 1 is excluded.

As shown in Table 13 above, the DwPTS region generally has an insufficient number of available REs compared to the DL subframe. In particular, when one NCCE is used, the problem of insufficient REs may become more serious.

For example, referring again to Table 13, the number of REs when one NCCE is used (see the number of REs when 6 subcarriers are used in Table 13) is a half of the number of REs when two NCCEs are used (see the number of REs when 12 subcarriers are used in Table 13). Particularly, when one NCCE is used, the number of available REs in the DwPTS may be much smaller than that in the DL subframe. For example, when special subframe configuration 9 or 10 is configured and one NCCE (or 6 subcarriers) is used, 24, 30, or 36 REs may be used in the DwPTS depending on CFI values. The 24, 30, or 36 REs may be about ⅓ compared to those when one NCCE is used in the normal DL subframe. As another example, when special subframe configuration 0 or 5 is configured and one NCCE is used, 6, 12, or 18 REs may be used in the DwPTS depending on CFI values. The 6, 12, or 18 REs may be about 1/12 to ⅕ compared to those when one NCCE is used in the normal DL subframe.

To solve this problem, Method 2-2 of the present disclosure proposes that, when the search space configuration including the DwPTS region is used, the UE does not expect aggregation level 1 in which only one NCCE is used. The proposed method (i.e., Method 2-2) may be applied only when the repetition actually used for the NPDCCH transmission (the repetition level, the repetition number, or the value of R) is 1 and the corresponding subframe is the special subframe.

According to Method 2-2 of the present disclosure, since the UE does not expect the search space configuration with aggregation level 1 for the DwPTS region (or TDD special subframe), the UE may configure the search space except aggregation level 1. In this case, the UE may perform the NPDCCH monitoring in the DwPTS region (or TDD special subframe) except search space candidates (or NPDCCH candidates) with aggregation level 1. In other words, the UE may monitor search space candidates (or NPDCCH candidates) with an aggregation level other than aggregation level 1 in the DwPTS region (or TDD special subframe). The UE may skip (or may not perform) the NPDCCH monitoring for the search space candidates (or NPDCCH candidates) with aggregation level 1 in the DwPTS region (or TDD special subframe).

According to Method 2-2 of the present disclosure, the search space may be configured with only aggregation level 2 in the DwPTS region (or TDD special subframe). That is, the UE may perform the NPDCCH monitoring only for search space candidates (or NPDCCH candidates) with aggregation level 2.

The aggregation level may indicate the number of NCCEs. In the NB-IoT, one NCCE may include 6 consecutive subcarriers (see Table 13 and the description thereof). Thus, aggregation level 1 means that the NPDCCH search space includes one NCCE, and aggregation level 2 means that the NPDCCH search space includes two NCCEs.

Whether Method 2-2 is applied may be determined by specific conditions. The specific conditions may be determined by combining at least one of Method 2-1-1 to Method 2-1-4. In this case, "Method 2-1" mentioned in Method 2-1-1 to Method 2-1-4 may be replaced with "Method 2-2".

For example, the UE may determine the number of available OFDM symbols in the DwPTS region of the TDD special subframe based on special subframe configuration information (e.g., special subframe configurations 0 to 10 in Table 13), information for the number of OFDM symbols for an LTE control channel (e.g., CFI information), and/or information for the NB-IoT operation mode (e.g., see FIGS. 19A to 19C and the description thereof). When the number of OFDM symbols in the DwPTS region is less than or equal to a specific value, the UE may determine that Method 2-2 is applied (see Method 2-1-1). When the number of available OFDM symbols in the DwPTS region is more than or equal to the specific value, Method 2-2 may not be applied and the DwPTS (or TDD special subframe) may not be included in the search space configuration.

For example, the UE may determine whether Method 2-2 is applied based on higher layer signaling (e.g., see Method 2-1-2). The higher layer signaling may include cell-common system information such as the SIB, or dedicated RRC signaling that the UE is capable of obtaining while transiting to the connected mode, etc. For example, since Method 2-2 of the present disclosure is applicable in the case of the CSS, the search space to which Method 2-2 is applied may include the CSS. As another example, in the case of USS, since Method 2-2 is applicable based on higher layer signaling (e.g., RRC signaling), the search space may include the USS according to the higher layer signaling (e.g., RRC signaling).

For example, the UE may determine whether to apply Method 2-2 based on the value of Rmax configured for the corresponding search space (e.g., see Method 2-1-3). When the value of Rmax is less than a specific value, the UE may determine that Method 2-2 is applied. When the value of Rmax is more than or equal to the specific value, the UE may determine that Method 2-2 is not applied.

For example, the UE may determine whether to apply Method 2-2 based on the number of repetitions R for the NPDCCH (i.e., NPDCCH candidate or NPDCCH search space) (see Method 2-1-4). Specifically, when the repetition number R is less than or equal to a specific value Rth, the UE may determine that Method 2-2 is applied. When the repetition number R is more than or equal to the specific value Rth, the UE may determine that Method 2-2—is not applied.

As described above, the TDD special subframe refers to the subframe including the DwPTS, GP, and UpPTS (e.g., see FIG. 4 and the description thereof) and may be applied when the UE is configured with frame structure type 2. In addition, the DwPTS may be referred to the DL period of the TDD special subframe, and the UpPTS may be referred to the UL period of the TDD special subframe.

Figure 30:
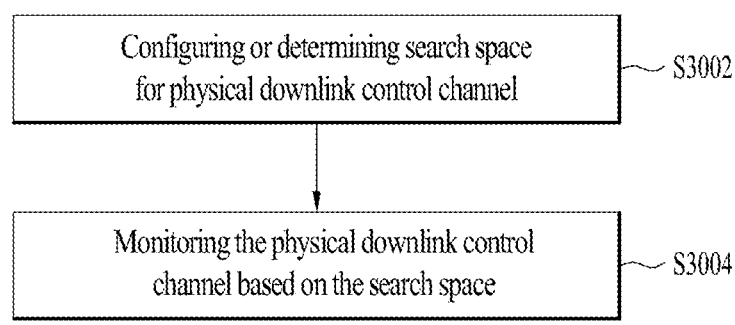
FIG. 30 illustrates a flowchart of a method according to the present disclosure.

FIG. 30 illustrates a flowchart of a method according to the present disclosure.

In step S3002, a UE may configure or determine a search space for a physical downlink control channel. Specifically, the UE may receive configuration information for an NPDCCH through higher layer signaling (e.g., RRC signaling), and configure or determine a search space for the NPDCCH based on the received configuration information. For example, the configuration information for the NPDCCH may include information indicating the maximum number of repetitions Rmax and information indicating the starting subframe of the search space for the NPDCCH. In addition, the UE may receive information indicating a subframe available for NB-IoT DL transmission and reception through the higher layer signaling (e.g., RRC signaling). As described above, the subframe indicated for the NB-IoT DL transmission and reception may be referred to as the valid DL subframe. The valid DL subframe may include not only a DL subframe but also a TDD special subframe.

In step S3002, a base station may perform the following operations in response to the UE operation. For example, the base station may transmit the configuration information for the NPDCCH through the higher layer signaling (e.g., RRC signaling). In addition, the base station may transmit to the UE the information indicating the valid DL subframe through the higher layer signaling (e.g., RRC signaling).

In step S3004, the UE may monitor the PDCCH based on the configured or determined search space. Similarly, the base station may map the NPDCCH based on the information transmitted to the UE and then transmit the NPDCCH.

In the method illustrated in FIG. 30, when Method 1 of the present disclosure is applied, the UE may configure or determine the search space for the physical downlink control channel (e.g., NPDCCH) without DwPTS (or TDD special subframe) (e.g., see section G.1). Similarly, when Method 1 of the present disclosure is applied, the base station may map the physical downlink control channel (e.g., NPDCCH) to the valid DL subframe other than the DwPTS (or TDD special subframe) and then transmit the physical downlink control channel (e.g., NPDCCH) to the UE. Whether Method 1 is applied may be determined based on one or more of Method 1-1 to Method 1-5.

In the method illustrated in FIG. 30, When Method 2 of the present disclosure is applied, the UE may configure or determine the search space for the physical downlink control channel (e.g., NPDCCH) with the DwPTS (or TDD special subframe) (e.g., see section G.2). For example, the UE may not expect PDCCH transmission in the search space including the DwPTS (or TDD special subframe) based on Method 2-1. As another example, the UE may not expect aggregation level 1 for the DwPTS (or TDD special subframe) based on Method 2-2. Similarly, when Method 2-1 of the present disclosure is applied, the base station may skip mapping/transmitting the physical downlink control channel ((e.g., NPDCCH) in the search space including the DwPTS (or TDD special subframe). When Method 2-2 of the present disclosure is applied, the base station may map/transmit the PDCCH based on an aggregation level other than aggregation level 1 for the DwPTS (or TDD special subframe). Whether Method 2-1 or Method 2-2 is applied may be determined based on one or more of Method 2-1-1 to Method 2-1-4.

Figure 31:
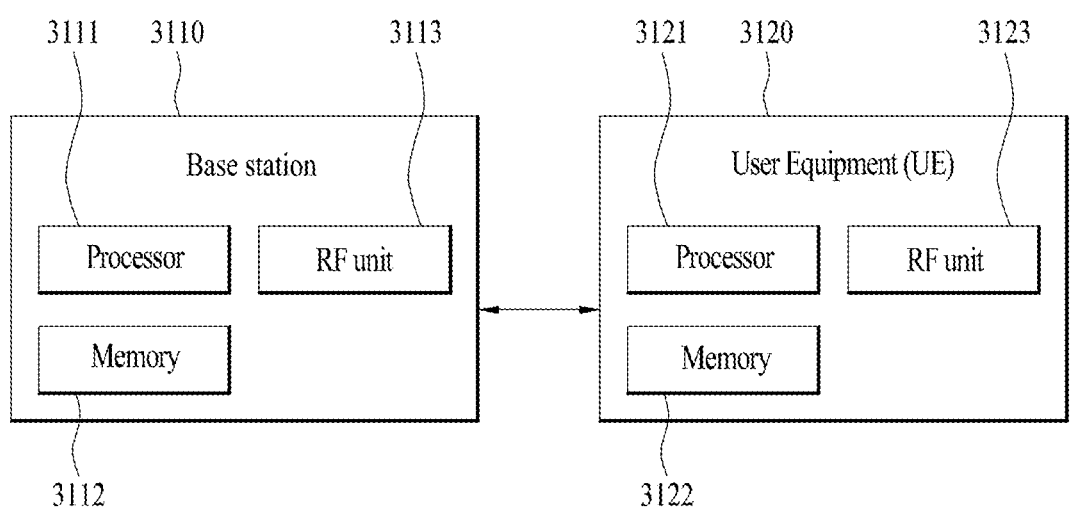
FIG. 31 illustrates an example of block diagrams of wireless communication apparatuses to which the methods proposed in the present disclosure are applicable.

FIG. 31 illustrates block diagrams of wireless communication apparatuses to which the methods proposed by the present disclosure are applicable.

Referring to FIG. 31, a wireless communication system comprises a base station 3110 and several user equipments (UEs) 3120 located in the region of the base station. For example, the base station and the UE shown in FIG. 31 may be wireless communication apparatuses represented by simplifying the above-described wireless communication apparatuses (e.g., base station 1110 and UE 1120 of FIG. 11).

Each of the base station and the UE may be referred to as a wireless device.

The base station comprises a processor 3111, a memory 3112, and a radio frequency (RF) module 3113. The processor 3111 implements functions, procedures, and/or methods proposed by the above-described methods of the present disclosure. Protocol layers of wireless interface may be implemented by the processor. The memory is coupled to the processor, and stores various information for operating the processor. The RF module is coupled to the processor, and transmits and/or receives a wireless signal.

The UE comprises a processor 3121, a memory 3122, and a RF module 3123.

The processor implements functions, procedures, and/or methods proposed by the above-described methods of the present disclosure. Protocol layers of wireless interface may be implemented by the processor. The memory is coupled to the processor, and stores various information for operating the processor. The RF module is coupled to the processor, and transmits and/or receives a wireless signal.

The memory 3112, 3122 may be inside or outside of the processor 3111, 3121, and may be coupled to the processor by the well-known various means.

Further, the base station and/or the UE may have a single antenna or multiple antennas.

The antenna(s) 3114, 3124 perform functions for transmitting and receiving a wireless signal.

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

For example, the present disclosure may be implemented a device or apparatus in the form of a system on chip (SOC). The device or apparatus may be equipped in the UE or the base station, and may comprise a memory and a processor. The memory stores instructions or executable codes and is operatively connected to the processor. The processor is coupled to the memory and may be configured to implement the operations including the methods in accordance to the present disclosure when executing the instructions or executable codes stored in the memory.

In a firmware or software implementation, methods according to the present disclosure may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present disclosure without departing from the scope of the invention. Thus, it is intended that the present disclosure cover the modifications and variations of this invention provided they come within the scope of the appended claims and their equivalents.

Although schemes of performing uplink transmissions in the wireless communication system of the present disclosure are described focusing on the examples applied to the 3GPP LTE/LTE-A system/5G system (New RAT system), the present disclosure can be applied to various wireless communication systems.

What is claimed is:

1. A method for receiving a signal by a user equipment (UE) in a 3rd generation partnership project (3GPP)-based wireless communication system supporting narrowband Internet of Things (NB-IoT) operating in time division duplex (TDD), the method comprising:

configuring a search space for a narrowband physical downlink control channel (NPDCCH); and monitoring NPDCCH candidates in a corresponding subframe based on the configured search space, wherein each NPDCCH candidate is configured with one or more narrowband control channel elements (NCCEs) based on a corresponding aggregation level (AL), and wherein, in monitoring the NPDCCH candidates:

based on that the corresponding subframe is a TDD special subframe between a downlink subframe and an uplink subframe, where the TDD special subframe includes a downlink pilot time slot (DwPTS), a guard period (GP), and an uplink pilot time slot (UpPTS), the UE monitors each NPDCCH candidate in the TDD special subframe, other than an AL-1-based NPDCCH candidate with one NCCE, and wherein the AL-1 based NPDCCH candidate is not monitored by the UE only in the TDD special subframe.

2. The method of claim 1, wherein the UE monitors an AL-2-based NPDCCH candidate with two NCCEs in the TDD special subframe.

3. The method of claim 1, wherein based on a number of NPDCCH repetitions being equal to 1, the AL-1-based NPDCCH candidate is not monitored by the UE in the TDD special subframe.

4. The method of claim 1, wherein based on a downlink period of the TDD special subframe including a specific number of orthogonal frequency division multiplexing (OFDM) symbols or less, the AL-1-based NPDCCH candidate is not monitored by the UE in the TDD special subframe.

5. The method of claim 1, wherein based on a value indicated by control format indicator (CFI) information for the TDD special subframe being less than a specific value, the AL-1-based NPDCCH candidate is not monitored by the UE in the TDD special subframe.

6. The method of claim 1, wherein based on a maximum number of NPDCCH repetitions being configured to be less than a specific value, the AL-1-based NPDCCH candidate is not monitored by the UE in the TDD special subframe.

7. The method of claim 1, wherein based on a number of NPDCCH repetitions being less than a specific value, the AL-1-based NPDCCH candidate is not monitored by the UE in the TDD special subframe.

8. The method of claim 7, wherein the specific value is indicated by higher layer signaling, or determined based on a maximum number of NPDCCH repetitions.

9. The method of claim 8, wherein one NCCE occupies 6 subcarriers.

10. The method of claim 1, wherein the NPDCCH is mapped on at least one of the DwPTS of the TDD special subframe or the downlink subframe.

11. A non-transitory processor readable medium recorded thereon instructions for executing the method of claim 1.

12. The method of claim 1, wherein the UE does not monitor the AL-1 based NPDCCH candidate in the TDD special subframe, irrespective of a number of NCCEs included in the TDD special subframe.

13. The method of claim 1, wherein the AL-1 based NPDCCH candidate is not monitored in all TDD special subframe configured in the UE.

14. The method of claim 1, wherein the AL-1 based NPDCCH candidate is not monitored by the UE, only based on the corresponding subframe being the TDD special subframe.

15. A user equipment (UE) configured to receive a signal in a 3rd generation partnership project (3GPP)-based wireless communication system supporting narrowband Internet of Things (NB-IoT) operating in time division duplex (TDD), the UE comprising:

a radio frequency (RF) transceiver; and a processor operatively connected to the RF transceiver, wherein the processor is configured to configure a search space for a narrowband physical downlink control channel (NPDCCH) and monitor NPDCCH candidates in a corresponding subframe based on the configured search space, wherein each NPDCCH candidate is configured with one or more narrowband control channel elements (NCCEs) based on a corresponding aggregation level (AL), and wherein, in monitoring the NPDCCH candidates:

based on that the corresponding subframe is a TDD special subframe between a downlink subframe and an uplink subframe, where the TDD special subframe includes a downlink pilot time slot (DwPTS), a guard period (GP), and an uplink pilot time slot (UpPTS), the processor monitors each NPDCCH candidate in the TDD special subframe, other than an AL-1-based NPDCCH candidate with one NCCE, and wherein the AL-1 based NPDCCH candidate is not monitored by the UE only in the TDD special subframe.

16. A processing device configured to control a user equipment (UE) to receive a signal in a 3rd generation partnership project (3GPP)-based wireless communication system supporting narrowband Internet of Things (NB-IoT) operating in time division duplex (TDD), the processing device comprising:

a memory including executable codes; and a processor operatively connected to the memory, wherein the processor is configured to execute the executable codes to implement operations comprising:

configuring a search space for a narrowband physical downlink control channel (NPDCCH); and monitoring NPDCCH candidates in a corresponding subframe based on the configured search space, wherein each NPDCCH candidate is configured with one or more narrowband control channel elements (NCCEs) based on a corresponding aggregation level (AL), and wherein, monitoring the NPDCCH candidates comprises:

based on that the corresponding subframe is a TDD special subframe between a downlink subframe and an uplink subframe, where the TDD special subframe includes a downlink pilot time slot (DwPTS), a guard period (GP), and an uplink pilot time slot (UpPTS), monitoring each NPDCCH candidate in the TDD special subframe, other than an AL-1-based NPDCCH candidate with one NCCE, and wherein the AL-1 based NPDCCH candidate is not monitored by the UE only in the TDD special subframe.

17. A method for transmitting a signal by a base station (BS) in a 3rd generation partnership project (3GPP)-based wireless communication system supporting narrowband Internet of Things (NB-IoT) operating in time division duplex (TDD), the method comprising:

configuring a search space for narrowband physical downlink control channel (NPDCCH) candidates each configured with one or more narrowband control channel elements (NCCEs) based on a corresponding aggregation level (AL); and transmitting an NPDCCH signal, in a corresponding subframe, based on the configured search space, wherein, in transmitting the NPDCCH signal, based on that the corresponding subframe is a TDD special subframe between a downlink subframe and an uplink subframe, which includes a downlink pilot time slot (DwPTS), a guard period (GP) and an uplink pilot time slot (UpPTS), the BS transmits the NPDCCH signal through a specific NPDCCH candidate in the TDD special subframe other than an AL-1 based NPDCCH candidate with 1-NCCE, and wherein the AL-1 based NPDCCH candidate is not used for the NPDCCH signal only in the TDD special subframe.

18. A base station (BS) configured to support a 3rd generation partnership project (3GPP)-based wireless communication, the BS comprising:

a transceiver; and a processor configured to control the transceiver to perform time division duplex (TDD) based narrowband Internet of Things (NB-IoT) operations, the TDD based NB-IoT operations comprising:

configuring a search space for narrowband physical downlink control channel (NPDCCH) candidates each configured with one or more narrowband control channel elements (NCCEs) based on a corresponding aggregation level (AL); and transmitting an NPDCCH signal, in a corresponding subframe, based on the configured search space, wherein, in transmitting the NPDCCH signal, based on that the corresponding subframe is a TDD special subframe between a downlink subframe and an uplink subframe, which includes a downlink pilot time slot (DwPTS), a guard period (GP) and an uplink pilot time slot (UpPTS), the NPDCCH signal is transmitted through a specific NPDCCH candidate in the TDD special subframe other than an AL-1 based NPDCCH candidate with 1-NCCE, and wherein the AL-1 based NPDCCH candidate is not used for the NPDCCH signal only in the TDD special subframe.

* * * * *